US012608041B2

(12) United States Patent
Lee et al.

(10) Patent No.: US 12,608,041 B2
(45) Date of Patent: Apr. 21, 2026

(54) FACILITATING VISUAL INTENT USING A DISPLAY FREE BODY WEARABLE COMPUTING DEVICE

(71) Applicant: Dell Products L.P., Round Rock, TX (US)

(72) Inventors: Seungmi Lee, Singapore (SG); Weiyi Wang, Singapore (SG); Si Fi Faye Li, Singapore (SG); Prabu Selvaraj, Singapore (SG); Yan Yan, Singapore (SG); Chin Leong Ong, Singapore (SG); Michiel Sebastiaan Emanuel Petrus Knoppert, Amsterdam (NL)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/788,849

(22) Filed: Jul. 30, 2024

(65) Prior Publication Data

US 2026/0037031 A1 Feb. 5, 2026

(51) Int. Cl.
*G06F 1/16* (2006.01)
*G06F 3/01* (2006.01)
(Continued)

(52) U.S. Cl.
CPC .............. *G06F 1/163* (2013.01); *G06F 3/017* (2013.01); *G06V 10/761* (2022.01); *G06V 20/44* (2022.01);
(Continued)

(58) Field of Classification Search
CPC .......... G06F 3/011; G06F 3/017; G06F 1/163; G06V 20/44; G06V 2201/07
See application file for complete search history.

(56) References Cited

U.S. PATENT DOCUMENTS

| | | | |
|---|---|---|---|
| 4,907,296 A | 3/1990 | Blecha | |
| 5,856,811 A | 1/1999 | Shih | |

(Continued)

FOREIGN PATENT DOCUMENTS

| | | | |
|---|---|---|---|
| CA | 3223178 A1 | 12/2022 | |
| WO | 202006819 A1 | 2/2020 | |

(Continued)

OTHER PUBLICATIONS

Schneider et al., "Gaze-aligned head-mounted camera with pan, tilt, and roll motion control for medical documentation and teaching applications", Oct. 2006, 2006 IEEE International Conference on Systems, Man, and Cybernetics, pp. 327-331 (5 pages).
(Continued)

*Primary Examiner* — Patrick F Marinelli
(74) *Attorney, Agent, or Firm* — WOMBLE BOND DICKINSON (US) LLP

(57) ABSTRACT

Methods and systems for facilitating use of a display free body wearable computing device in an object laden environment are disclosed. The method may include identifying an occurrence of a multimodal request event from a user of the display free body wearable computing device and for information regarding an object of objects present in the object laden environment. The method may also include disambiguating an intent of the user with respect to the object from other objects. To do so, the display free body wearable computing device may actively guide the user to establish a framed object view of at least the object, obtain user input relevant to a prompt for information, and in an instance where a subject for the prompt is not disambiguated, clarifying the subject with the user.

20 Claims, 12 Drawing Sheets

(51) Int. Cl.

| | | |
|---|---|---|
| *G06V 10/74* | (2022.01) |
| *G06V 20/40* | (2022.01) |
| *H04N 13/239* | (2018.01) |

(52) U.S. Cl.
CPC ....... *H04N 13/239* (2018.05); *G06V 2201/07* (2022.01)

(56) References Cited

U.S. PATENT DOCUMENTS

| | | | |
|---|---|---|---|
| 7,810,750 | B2 | 10/2010 | Abreu |
| 8,159,519 | B2 | 4/2012 | Kurtz |
| 8,902,315 | B2 | 12/2014 | Fisher et al. |
| 9,538,072 | B2 | 1/2017 | Stewart et al. |
| 10,110,805 | B2 | 10/2018 | Pomerantz |
| 10,163,210 | B2 | 12/2018 | Kim |
| 10,389,993 | B2 | 8/2019 | Macmillan et al. |
| 10,924,651 | B2 | 2/2021 | Chaudhri et al. |
| 11,196,863 | B2 | 12/2021 | Spohrer |
| 11,206,325 | B1 | 12/2021 | Dennis |
| 11,431,038 | B2 | 8/2022 | Jhawar et al. |
| 11,431,660 | B1 | 8/2022 | Leeds et al. |
| 11,489,996 | B2 | 11/2022 | Burton |
| 11,523,055 | B1 | 12/2022 | Chaudhri et al. |
| 11,523,243 | B2 | 12/2022 | Satongar et al. |
| 11,567,569 | B2 | 1/2023 | Spencer |
| 11,790,614 | B2 * | 10/2023 | Zohar .................... G06F 3/015 |
| | | | 345/633 |
| 11,816,269 | B1 | 11/2023 | Chaudhri et al. |
| 11,899,911 | B2 | 2/2024 | Kocienda et al. |
| 12,026,842 | B1 | 7/2024 | Mayoral |
| 12,299,830 | B2 * | 5/2025 | Zohar .................... G06V 40/20 |
| 2009/0122161 | A1 | 5/2009 | Bolkhovitinov |
| 2011/0279666 | A1 | 11/2011 | Strombom |
| 2014/0146153 | A1 | 5/2014 | Birnkrant |
| 2015/0009550 | A1 | 1/2015 | Misago |
| 2016/0225192 | A1 | 8/2016 | Jones |
| 2017/0007351 | A1 | 1/2017 | Yu |
| 2017/0099479 | A1 | 4/2017 | Browd |
| 2017/0181802 | A1 | 6/2017 | Sachs |
| 2017/0322410 | A1 | 11/2017 | Watson |
| 2018/0012413 | A1 | 1/2018 | Jones |
| 2018/0325498 | A1 | 11/2018 | Bongiorno et al. |
| 2019/0253700 | A1 | 8/2019 | Torneus |
| 2019/0254754 | A1 | 8/2019 | Johnson |
| 2019/0370532 | A1 | 12/2019 | Soni |
| 2020/0117025 | A1 | 4/2020 | Sauer |
| 2020/0330179 | A1 | 10/2020 | Ton |
| 2021/0067764 | A1 | 3/2021 | Shau |
| 2021/0117680 | A1 | 4/2021 | Chaudhri et al. |
| 2021/0169417 | A1 | 6/2021 | Burton |
| 2021/0173480 | A1 | 6/2021 | Osterhout et al. |
| 2022/0050580 | A1 * | 2/2022 | Takimoto ................ G06F 16/00 |
| 2023/0111489 | A1 * | 4/2023 | Zohar ................. G06V 40/103 |
| | | | 345/633 |
| 2023/0280821 | A1 | 9/2023 | Kocienda et al. |
| 2023/0280866 | A1 | 9/2023 | Kocienda et al. |
| 2023/0281254 | A1 | 9/2023 | Kocienda et al. |
| 2023/0281256 | A1 | 9/2023 | Kocienda et al. |
| 2023/0282214 | A1 | 9/2023 | Kocienda et al. |
| 2023/0283705 | A1 | 9/2023 | Chaudhri et al. |
| 2023/0283885 | A1 | 9/2023 | Kocienda et al. |
| 2023/0283886 | A1 | 9/2023 | Kocienda et al. |
| 2023/0324993 | A1 * | 10/2023 | McDaniel ............... G06F 3/014 |
| | | | 345/156 |
| 2023/0327497 | A1 | 10/2023 | Chaudhri et al. |
| 2023/0419621 | A1 * | 12/2023 | Zohar .................... G06F 3/015 |
| 2024/0126363 | A1 | 4/2024 | Kocienda et al. |
| 2024/0155194 | A1 | 5/2024 | Kocienda et al. |
| 2024/0242721 | A1 | 7/2024 | Kocienda et al. |
| 2024/0403772 | A1 * | 12/2024 | Lafreniere .............. G06F 3/011 |
| 2025/0199621 | A1 * | 6/2025 | Moll .................... G06F 3/0482 |
| 2025/0232400 | A1 * | 7/2025 | Chen ...................... G06F 1/163 |

FOREIGN PATENT DOCUMENTS

| | | |
|---|---|---|
| WO | 2020068819 A1 | 4/2020 |
| WO | 2020/257329 A1 | 12/2020 |
| WO | 2023/168001 A1 | 9/2023 |
| WO | 2023/168071 A1 | 9/2023 |
| WO | 2023/168073 A1 | 9/2023 |
| WO | 2024/118974 A1 | 6/2024 |

OTHER PUBLICATIONS

Schneider et al., "Movies Made Through the Eyes of a Mobile User With a Gaze-Aligned Camera", ICME 2006, pp. 2121-2124 (4 pages).

Md Messal Monem Miah et al., "Multimodal Contextual Dialogue Breakdown Detection for Conversational AI Models", NAACL 2024 Industry Track, arXiv:2404.08156v1, Apr. 11, 2024, <https://arxiv.org/abs/2404.08156v1>, retrieved on Jul. 24, 2024 (12 pages).

Donggang Jia et al., "Voice: Visual Oracle for Interaction, Conversation, and Explanation", arXiv:2304.04083v2, Jan. 22, 2024, <https://arxiv.org/abs/2304.04083>, pp. 1-21, retrieved on Jul. 24, 2024 (21 pages).

Ambuj Mehrish et al., "A Review of Deep Learning Techniques for Speech Processing", arXiv:2305.00359v3, May 30, 2023, <https://arxiv.org/pdf/2305.00359>, pp. 1-111, retrieved on Jul. 24, 2024 (111 pages).

Giuseppe Attanasio et al., "Twists, Humps, and Pebbles: Multilingual Speech Recognition Models Exhibit Gender Performance Gaps", arXiv:2402.17954v2, Jun. 19, 2024, <https://arxiv.org/pdf/2402.17954>, retrieved on Jul. 24, 2024 (23 pages).

Konstantinos Tsiakas et al., "Unpacking Human-AI interactions: From interaction primitives to a design space", arXiv:2401.05115v1, Jan. 10, 2024, < https://arxiv.org/abs/2401.05115>, pp. 1-46, retrieved on Jul. 24, 2024 (46 pages).

Pabbathi Sri Charan et al., "Effective Gesture Based Framework for Capturing User Input", arXiv:2208.00913, Aug. 1, 2022, <https://arxiv.org/ftp/arxiv/papers/2208/2208.00913.pdf>, pp. 1-10, retrieved on Jul. 24, 2024 (10 pages).

Chao Chen et al., "Simple calibration method for dual-camera structured light system", Journal of the European Optical Society-Rapid Publications, 14, Article No. 23 (2018), Oct. 26, 2018, <https://doi.org/10.1186/ s41476-018-0091-y>, pp. 1-11 pages, retrieved on Jul. 24, 2024 (11 pages).

David Pierce, "Limitless is a new AI tool for your meetings—and an all-hearing wearable gadget", The Verge, Apr. 15, 2024, <https://www.theverge.com/2024/4/15/24130832/limitless-ai-pendant-wearable-meetings> retrieved on Jul. 30, 2024 (8 pages).

* cited by examiner

Body Wearable Computing Device 50

Adjustment Member 102

Flexible Band 111

Sensor Module 106

Camera 110

Integrated Sensing and Interaction Component 100

Touchpad 108

Bendable Hinge 112

Data Processing System 114

Battery 116

Curved Headband 118

Integrated Computing, Powering, and Securing Portion 104

Adjustment Member 102

Integrated Sensing and Interaction Component 100

Integrated Computing, Powering, and Securing Portion 104

Curved headband 118

Camera 110

Eye Line of Sight 140

Camera Line of Sight 142

Object 402B

Object 402A

Camera Frame 406F

FACILITATING VISUAL INTENT USING A DISPLAY FREE BODY WEARABLE COMPUTING DEVICE

FIELD

Embodiments disclosed herein relate generally to facilitating use of a display free body wearable computing device. More particularly, embodiments disclosed herein relate to facilitating use of a display free body wearable computing device in an object laden environment by disambiguating an intent of the user with respect to an object in the object laden environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
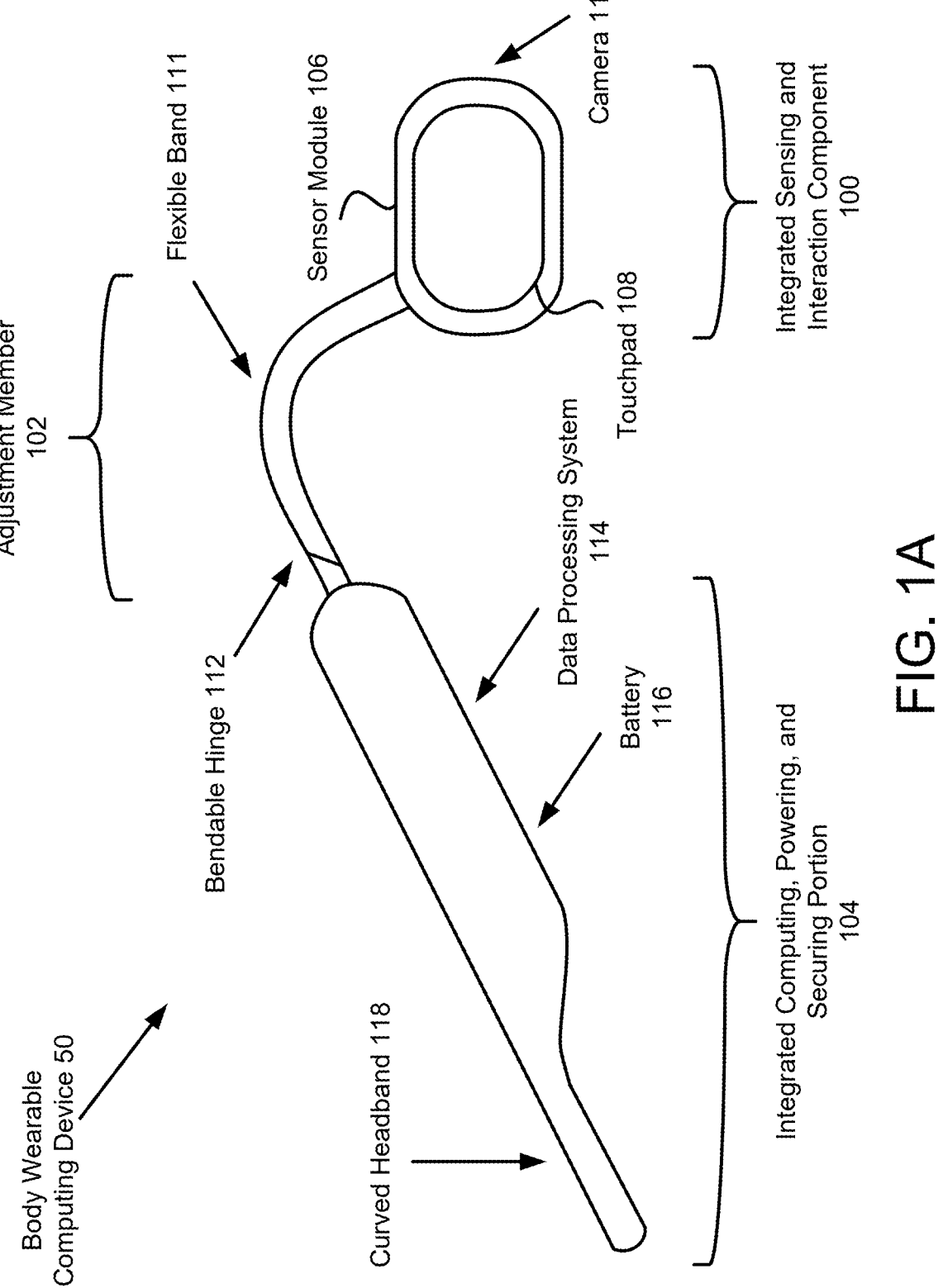
FIG. 1A shows a diagram illustrating a display free body wearable computing device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for facilitating use of a display free body wearable computing device in object laden environments. The display free body wearable computing device may provide computer-implemented services relevant to an object present in the object laden environment.

The display free body wearable computing device may be configured to be worn on a user's head. When worn by the user, the display free body wearable computing device may provide the computer-implemented services by interacting with the user.

The display free body wearable computing device may include sensors (e.g., cameras, a microphone array, etc.) that may identify an occurrence of a multimodal request event. The multimodal request event may include, for example, recognizable gestures (e.g., pointing gestures, framing gestures, etc.), voice commands, and/or any other user input provided by the user that may indicate a request for information regarding an object of objects present in the object laden environment.

When the multimodal request event is identified, the display free body wearable computing device may screen at least an indicator of a portion of the multimodal request event for conditions that may indicate that the user is not interest in the information regarding the object. For example, the indicator may indicate that the portion (e.g., a pointing gesture) of the multimodal request event was not intentionally performed by the user.

In an instance of the screening where the indicator does not exhibit any of the conditions, the display free body wearable computing device may cooperatively disambiguate an intent of the user with respect to the object. To do so, the display free body wearable computing device may actively guide movement of the user using sensory feedback (e.g., audio cues) to establish a framed object view. For example, the user may be actively guided to reposition the user's head with respect to the object so that a field of view of at least one image sensor of the display free body wearable computing device may include a desired view of the object.

When the framed object view is established, the display free body wearable computing device may obtain user input relevant to a prompt for the information regarding the object. Because the object laden environment may include any number and/or types of objects, a subject for the prompt may not be defined and/or be disambiguated from other potential subjects (e.g., other objects).

To identify whether the subject for the prompt is defined, a stereo image captured by the at least two image sensors may be processed to obtain an object recognition result, and the user input may be interpreted to identify a likely subject. The object recognition result may be compared to the likely subject to obtain a list of likely subjects. If the list of likely subject does not include exactly one likely subject, the display free body wearable computing device may conclude that the subject for the prompt is not clearly defined. For example, if multiple objects in the object laden environment match a description for the object that the user desires information, the display free body wearable computing device may identify the multiple objects as the likely subjects and the subject for the prompt is therefore not defined.

To clarify the subject for the prompt, the display free body wearable computing device may identify qualities of each object of the objects present in the framed object view. The display free body wearable computing device may communicate, a question to the user using a quality of the qualities of an object to provisionally confirm the subject. A response may subsequently communicate a response confirming the subject and/or any number of additional refinement communications may be communicated between the user and the display free body wearable computing device.

Once confirmed as the subject for the prompt, the display free body wearable computing device may provide computer-implemented services by providing desired information regarding the object to the user.

Thus, embodiments disclosed herein may provide an improved method for facilitating use of a display free body wearable computing device by disambiguating an intent of the user with respect to an object in an object laden environment. By doing so, a quality and/or relevancy of computer-implemented services provided by the display free body wearable computing device to the user may be improved.

In an embodiment, a method for facilitating use of a display free body wearable computing device in an object laden environment is provided. The method may include: (i) identifying, using at least one image sensor of the display free body wearable computing device, an occurrence of a multimodal request event: (a) from a user of the display free body wearable computing device, and (b) for information regarding an object of objects present in the object laden environment; (ii) based on the occurrence: (a) screening at least an indicator captured by the at least one image sensor for conditions that indicate that the user is not interested in the information regarding the object; (b) in an instance of the screening where the indicator does not exhibit any of the conditions: (i) cooperatively, with the user, disambiguating an intent of the user with respect to the object from other objects of the objects; and (ii) based on the disambiguated intent, providing computer-implemented services.

The indicator may include a pointing gesture depicted in an image captured by the at least one image sensor, and the pointing gesture is used by the user to convey interest in the object.

Cooperatively disambiguating the intent of the user may include: (i) actively guiding movement of the user using sensory feedback to establish, using at least two image sensors of the display free body wearable computing device, a framed object view of a portion of the object laden environment comprising at least the object; (ii) obtaining, using at least one sensor of the display free body wearable computing device, at least one portion of user input relevant to a prompt for the information; (iii) identifying, based on the at least one portion of user input, whether a subject for the prompt is disambiguated from other potential subjects for the prompt; (iv) in an instance of the identifying where the subject for the prompt is not disambiguated: (a) clarifying the subject for the prompt.

The conditions may include at least one selected from a group consisting of: (i) a distance of the pointing gesture with respect to the at least one image sensor exceeding a distance threshold; (ii) a time that the pointing gesture is maintained in a field of view of the at least one image sensor meeting criteria; and (iii) an identification that the user is having a conversation.

Actively guiding the movement of the user using sensory feedback may include: (i) providing at least audio cues adapted to direct the user to reposition the user's head with respect to the object while the user is wearing the display free body wearable computing device; and (ii) providing a confirmation audio cue to the user when the framed object view of the at least one object is established through the repositioning of the user's head.

The at least one portion of user input may include: (i) a voice input describing an identity of the subject; (ii) a voice input describing a characteristic of the subject; and (iii) a pointing gesture directed towards the subject.

Identifying whether the subject for the prompt is disambiguated may include: (i) processing a stereo image obtained by the at least two image sensors and using the framed object view to obtain an object recognition result, the object recognition result indicating one or objects present in the framed object view; (ii) interpreting the at least one portion of user input to identify a likely subject; (iii) matching the object recognition result to the likely subject to obtain a list of likely subjects; and (iv) in a first instance of the matching where the list of likely subjects comprises one object that is the likely subject: (a) concluding that the subject for the prompt is disambiguated; and (v) in a second instance of the matching where the list of likely subjects does not comprise the one object that is the likely subject: (a) concluding that the subject for the prompt is not disambiguated.

Clarifying the subject for the prompt may include: (i) identifying qualities of each object of the one or more objects present in the framed object view; (ii) communicating, using at least a speaker of the display free body wearable computing device, a question to the user using a quality of the qualities of an object of the one or more objects to provisionally confirm the subject; and (iii) obtaining, using an audio sensor of the display free body wearable computing device, a response from the user confirming that the provisionally confirmed subject is the subject.

The method may also include, prior to obtaining the at least one portion of the of the user input relevant to the prompt: (i) obtaining, using the at least one image sensor, an image depicting a second gesture performed by the user to convey interest in capturing a snapshot stereo image of the framed object view.

The snapshot stereo image may enable, during the computer implemented services, sequential re-prompting for sequentially refined information regarding the subject.

The display free body wearable computing device may include: (i) an integrated sensing and interaction component adapted to: (a) be positioned symmetrically on two portions of a user's head, (b) be positioned between ears and eyes of the user, and (c) capture a stereo image of at least a portion of a scene present in a field of view of the user; (ii) an integrated computing, powering, and securing portion; and (iii) an adjustment member adapted to position the integrated sensing and interaction component with respect to the integrated computing, powering, and securing portion.

The integrated sensing and interaction component may include: (i) a pair of cameras; (ii) speakers; (iii) a microphone array; and (iv) a touch pad.

The integrated sensing and interaction component may be adapted to: (i) obtain the stereo image from the pair of cameras; (ii) at least partially process the stereo image to obtain an image processing result; (iii) identify an action to be performed based, at least in part, on the image processing result and a derived result from a remote entity, the derived result being based, at least in part, on the stereo image and/or the image processing result; and (iv) use at least the speakers to perform the action.

The integrated computing, powering, and securing portion may be adapted to: (i) obtain an audio input from the integrated sensing and interaction component; (ii) perform a speech recognition action set, based on the audio input, to obtain a speech recognition result; (iii) obtain a portion of data from a remote entity, the data being based at least in part on the speech recognition result; and (iv) use the portion of the data to assist in an interaction that the user is involved in.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, various types of computing devices may provide computer implemented services. The various types of computing devices may include, for example, desktop computers, laptop computers, cell phones, and/or other types of computing devices.

Such computing devices may provide any number and types of computer-implemented services (e.g., to a user of the computing device and/or devices operably connected to the computing device). The computer-implemented services may include, for example, data acquisition services, communication services, and/or other types of services that may be relevant to user and/or other devices.

However, the ability to provide such services may be limited based on the information available to the computing devices. For example, a desktop computer may be positioned under a desk, or in other locations. Consequently, the desktop computer may have a very limited capability to gather information regarding the environment in which it resides.

Accordingly, due to the limited information, the types and quality of computer implemented services may be limited. Returning to the desktop computer example, such desktop computers may lack native ability to capture images and/or audio of scenes that are relevant to a user of the desktop computer. Thus, the desktop computer may lack the ability to provide some types of services that are relevant to a user.

In general, embodiments disclosed herein relate to systems, methods, and devices for providing computer implemented services that are of relevance to users. To provide the computer implemented services, a display free body wearable computing device may be utilized. For example, display free body wearable computing device 50 may be adapted to be worn by a user. When worn by a user, the body wearable computing device may be able to gather information that is more relevant to users for use in providing computer-implemented services.

The computer-implemented services may include, for example, providing information regarding an object of objects present in an object laden environment. To provide the information, display free body wearable computing device 50 may identify, using at least one image sensor of display free body wearable computing device 50, an occurrence of a multimodal request event. The multimodal request event may include, for example, an indicator (e.g., a pointing gesture) performed by the user to convey interest in the object.

When identified, the indicator may be screened for conditions that may indicate that the user is not interested in the information. For example, the conditions may include a time that the pointing gesture is performed meeting a time criteria, a distance that the pointing gesture is identified exceed a distance threshold, an identification that the user may be having a conversation (e.g., the gesture is directed at a second person and not direct at display free body wearable computing device 50).

Once identified that the indicator does not exhibit any of the conditions, intent of the user may be disambiguated by display free body wearable computing device 50. To do so, display free body wearable computing device 50 may actively guide movement of the user using sensory feedback (e.g., audio cues via at least one speaker of display free body wearable computing device 50) to establish a framed object view of the object for at least one image sensor of display free body wearable computing device 50. Once established, display free body wearable computing device 50 may obtain user input regarding a prompt for the information.

The prompt may include, for example, a question regarding a subject for the framed object view. If the subject is not disambiguated from other potential subjects (e.g., a plurality of objects is present in the framed object view and/or a plurality of objects match a description of the prompt), display free body wearable computing device may disambiguate the subject by clarify the subject with the user. To do so, display free body wearable computing device 50 may identify qualities of the potential subjects and communicate a question using at least a quality of the qualities to provisionally confirm the subject with the user. By doing so, intent of the user may be disambiguated with respect to an object present in the object laden environment.

Based on the disambiguated intent of the user, display free body wearable computing device 50 may provide relevant information regarding the object to the user. Therefore, through use of this more relevant information, the display free body wearable computing device may be more likely to provide computer-implemented services that are of higher relevancy to users.

To provide the computer-implemented services to the user of body wearable computing device 50, display free body wearable computing device 50 may include: (i) integrated sensing and interaction component 100, (ii) adjustment member 102, and (iii) integrated computing, powering, and securing portion 104. Each of these components is discussed below.

Integrated sensing and interaction component 100 may provide input/output services to the user. To do so, integrated sensing and interaction component 100 may host sensors module 106, touchpad 108, camera 110, and/or any other components. To host the components, integrated sensing and interaction component 100 may include a pair of enclosures (e.g., 3-dimensional bubble-shaped housings that may be at least partially transparent) adapted to be positioned symmetrically on both sides of the user's head, between ears and eyes of the user (e.g., proximate to temples of the user). When worn, integrated sensing and interaction component 100 may operate, for example, without covering the user's ear and extending past the user's eyes. By being positioned as such, the body wearable computing device may be worn and used to interact with the user without obstructing facial features (e.g., eyes, ears, etc.) of the user.

Integrated sensing and interaction component 100 may obtain inputs from any number of sensors to identify actions to be performed. For example, integrated sensing and interaction component 100 may obtain guidance image using camera 110 and at least partially process the guidance image to obtain an image processing result. The guidance image may depict a portion of the scene and a portion of the user (e.g., one or more of the user's hands) of display free body wearable computing device 50. Integrated sensing and interaction component 100 may identify a recognizable gesture (e.g., a pointing gesture, framing gesture, etc.) from the guidance image that may trigger an action set for capturing an image. Integrated sensing and interaction component 100 may also obtain and use audio inputs (e.g., voice commands) for use in identifying actions sets for capturing an image, individually and/or cooperatively with visual inputs (e.g., the guidance image).

For example, consider a scenario in which a user raises a hand to point at car while issuing a voice command to take a picture. Integrated sensing and interaction component 100 may identify the user's hand as a pointing gesture and/or identify the voice command issued by the user. Integrated sensing and interaction component 100 and/or any other entities (e.g., data processing system 114, remote entities, etc.) may subsequently identify an action set based on the gesture and/or the voice command. The action set may include, for example, audio instructions using speakers of integrated sensing and interaction component 100 to direct the user to remove the user's hand from a field of view while retaining the car in the field of view, activating image sensors of camera 110 to capture a stereo image, combining the stereo image, and/or any other actions.

Touchpad 108 may be used to receive tactile input. For example, a user may provide input by using one or more fingers to touch, press, any/or perform any other actions using touchpad 108. The input may be used, for example, to trigger actions, provide information to the display free body wearable computing device for use in providing computer-implemented services, and/or any other use cases. To improve ease of use, touchpad 108 may be affixed to a lateral side of integrated sensing and interaction component 100 away from the user's head when worn. Touchpad 108 may be included on either or both enclosures of integrated sensing and interaction component 100.

Sensor module 106 may provide at least a portion of the input/output services provided by integrated sensing and interaction component 100. To do so, sensors module 106 may include any number and/or type of sensors. For example, sensors module 106 may include speakers and a microphone array. The microphone array of sensor module may obtain, for example, a voice command from the user. Integrated sensing and interaction component 100 may process the voice command to trigger an action set to capture an image of the scene. Sensor module 106 may also provide audio output (e.g., via the speakers). The audio output may include, for example, instructions to direct movement of a portion of the user while capturing an image, information regarding a status of the images captured, and/or any other information.

Camera 110 may capture images. The images captured by camera 110 may include stereo images of at least a portion of a scene present in a field of view of the user. The stereo images may include a pair of images of the scene, each of the images being captured at different angle and/or positions (e.g., different viewpoints) with respect to the scene by camera 110.

To do so, camera 110 may include a pair of cameras that may each be positioned inside an enclosure of the pair of enclosures of integrated sensing and interaction component 100 on both sides of the user's head between eyes and ears of the user. Furthermore, camera 110 may be pointed in a direction generally aligned with a direction that the user's eyes may be pointed. By being positioned as such, camera 110 may be configured to establish a camera line of sight that is parallel to a line of sight of the user, and a camera field of view that include the field of view of the user. Refer to FIGS.

1C-1D for additional details regarding the camera field of view and the camera line of sight relative to the user.

Camera 110 may configure image capturing settings (e.g., focus, zoom, etc.) based on information obtained by integrated sensing and interaction component 100 and/or any other components of display free body wearable computing device 50 (e.g., data processing system 114).

Adjustment member 102 may at least partially secure display free body wearable computing device 50 to the user's head and be adapted to position integrated sensing and interaction component 100 with respect to integrated computing, powering, and securing portion 104. To do so, adjustment member may include flexible band 111 and bendable hinge 112.

Flexible band 111 may be configured in a shape (e.g., a curved shape) that may enable adjustment member 102 to rest on an ear of the user while display free body wearable computing device 50 is used by the user. Furthermore, flexible band 111 (e.g., the shape of flexible band 111) may be modified (e.g., via bending) to improve comfort and/or fit of display free body wearable computing device 50 while used by the user.

Bendable hinge 112 may enable repositioning of integrated sensing and interaction component 100 with respect to integrated computing, powering, and securing portion 104. For example, when bendable hinge 112 is in a first state (e.g., not bent), integrated computing, powering, and securing portion 104 may be configured to be positioned around the back of the user's head while integrated sensing and interaction component 100 is positioned between ears and eyes of the user. Alternatively, when bendable hinge 112 is in a second state (e.g., bent at a certain angle), integrated computing, powering, and securing portion 104 may be configured to be positioned around the top of the user's head while integrated sensing and interaction component 100 is positioned between ears and eyes of the user.

Integrated computing, power, and securing portion 104 may provide at least a portion of the computer-implemented services and may at least partially secure display free body wearable computing device 50 to the user. To do so, integrated computing, powering, and securing portion 104 may include an enclosure that includes: (i) data processing system 114, (ii) battery 116, and (iii) curved headband 118.

Data processing system 114 may provide computer-implemented services based on inputs (e.g., stereo images, audio inputs, etc.) obtained from integrated sensing and interaction component 100. To do so, data processing system 114 may host any quantity of hardware resources that may include, for example, a processor operably coupled to memory, storage, and/or other hardware components (e.g., sensors of integrated sensing and interaction component 100). Data processing system 114 may facilitate performance of actions requested by a user of display free body wearable computing device 50 (e.g., independently and/or cooperatively with remote entities that may provide a second portion of computer-implemented services).

Using the hosted hardware resources and/or applications supported by the hardware resources, data processing system 114 may provide services relevant to images, audio, text, decision making, and/or any other capabilities. For example, data processing system 114 may perform operations relevant to the service and/or data processing system 114 may communicate with remote entities using a network stack hosted by hardware resources of data processing system 114.

To provide services relevant to images (e.g., pictures, video, etc.), data processing system 114 may obtain image data from one or more cameras of camera 110. The image data may be used to identify user inputs (e.g., hand gestures) that may indicate requests for actions to be performed by the body wearable computing device. Data processing system 114 may subsequently make decisions to handle the requests based on the user input. Additionally, data processing system 114 may perform image stitching using a stereo image of the image data to obtain a unified image of a portion of a scene present in a field of view of the user. Data processing system 114 may process and/or perform actions based on derived information from the unified image.

To handle the requests based on the user inputs for decision making, data processing system 114 may utilize hardware and/or software adapted to process the user inputs. For example, data processing system 114 may use a tactile input handling application to make decisions (e.g., perform an action set, communicate information, etc.) based on tactile input received from touchpad 108.

Additionally, data processing system 114 may perform services based on audio input received from a microphone array of sensor module 106 that may include, for example, transcription, speaker segmentation, and/or any other service. To do so, data processing system 114 may, for example, host applications adapted to interpret conversations, recognize speech, convert speech to text, and/or perform any other operations. Data processing system 114 may similarly make decisions based on information obtained from the audio input.

To communicate results of the services to the user of the body wearable computing device, data processing system 114 may send information to be output from speakers of sensor module 106. To do so, data processing system 114 may utilize hardware and/or software to transmit the information to the speakers. For example, an application may convert text results obtained from the audio and/or image services, as discussed above, to an audio output format that may be communicated to the user.

Consider a scenario in which the unified image includes the user's hands and a sign with words written in a certain language. Data processing system 114 and/or integrated sensing and interaction component 100 may recognize hand gestures performed by the user's hands that may indicate a request for display free body wearable computing device 50 to translate and/or dictate a phrase written on the sign. Data processing system 114 may subsequently communicate the image and/or information from the image to any number and/or type of remote entities (e.g., cloud services, remote artificial intelligence platforms, etc.) that may provide additional services that may provide requested information/results to data processing system 114. Data processing system 114 may then provide instructions to integrated sensing and interaction component 100 to dictate (e.g., using speakers) the requested information.

Battery 116 may supply electrical power to data processing system 114, components of integrated sensing and interaction component 100, and/or any other entities. To do so, battery 116 may obtain and/or store electrical power provisioned by an external power source. The electrical power may subsequently be provided to components of display free body wearable computing device 50 that may request the electrical power for operation.

Curved headband 118 may connect two portions of the body wearable computing device. For example, curved headband may be configured in a curved shape and be adapted to connect a first side of display free body wearable computing device 50 (e.g., including a first portion of integrated sensing and interaction component 100, adjustment member 102, etc.) that may be positioned on the first side of the user's head to a second side of display free body wearable computing device 50 that may be positioned on the second side of the user's head.

While illustrated in FIG. 1A with a limited number of specific components, a system may include additional, fewer, and/or different components without departing from embodiments disclosed herein.

Thus, as shown in FIG. 1A, display free body wearable computing device 50 may provide computer-implemented services to a user using components adapted to capture images of a portion of a scene desired by the user.

Figure 1B:
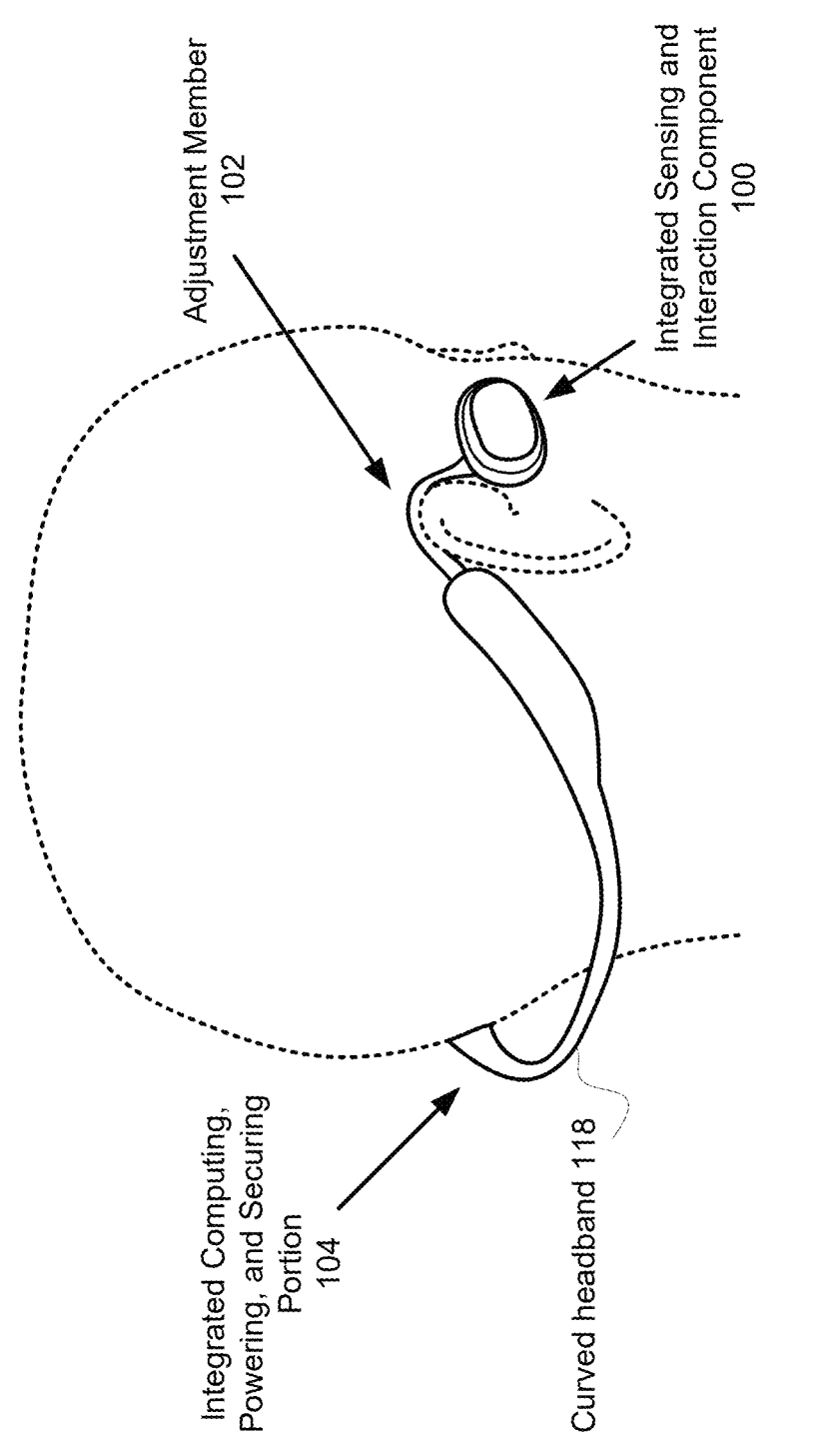
FIGS. 1B-1D show diagrams illustrating alternative views of the display free body wearable computing device in accordance with an embodiment.

Turning to FIG. 1B, an alternate view of display free body wearable computing device 50 in accordance with an embodiment is shown.

In FIG. 1B, display free body wearable computing device 50 may be illustrated while worn by a user (drawn in short-dashed outline). As shown in FIG. 1B, a portion of integrated sensing and interaction component 100 of display free body wearable computing device 50 is positioned on a first side of the user's head between an eye and an ear of the user while a portion of adjustment member 102 rests on the ear of the user. While not shown, it may be appreciated that a second portion of integrated sensing and interaction component 100 and a second portion of adjustment member 102 may be similarly positioned on a second side of the user's head.

Integrated computing, powering, and securing portion 104 and curved headband 118 of integrated computing, powering, and securing portion 104 may connect the first portions and second portions of adjustment member 102 and integrated sensing and interaction component 100. To do so, curved headband 118 may wrap around the back of the user's head, as shown, while adjustment member 102 is in a first configuration (e.g., not bent). While not shown, it may be appreciated that curved headband 118 and integrated computing, powering, and securing portion 104 may be positioned around the top of the user's head and/or any other position when adjustment member 102 is in a second configuration.

Figure 1C:
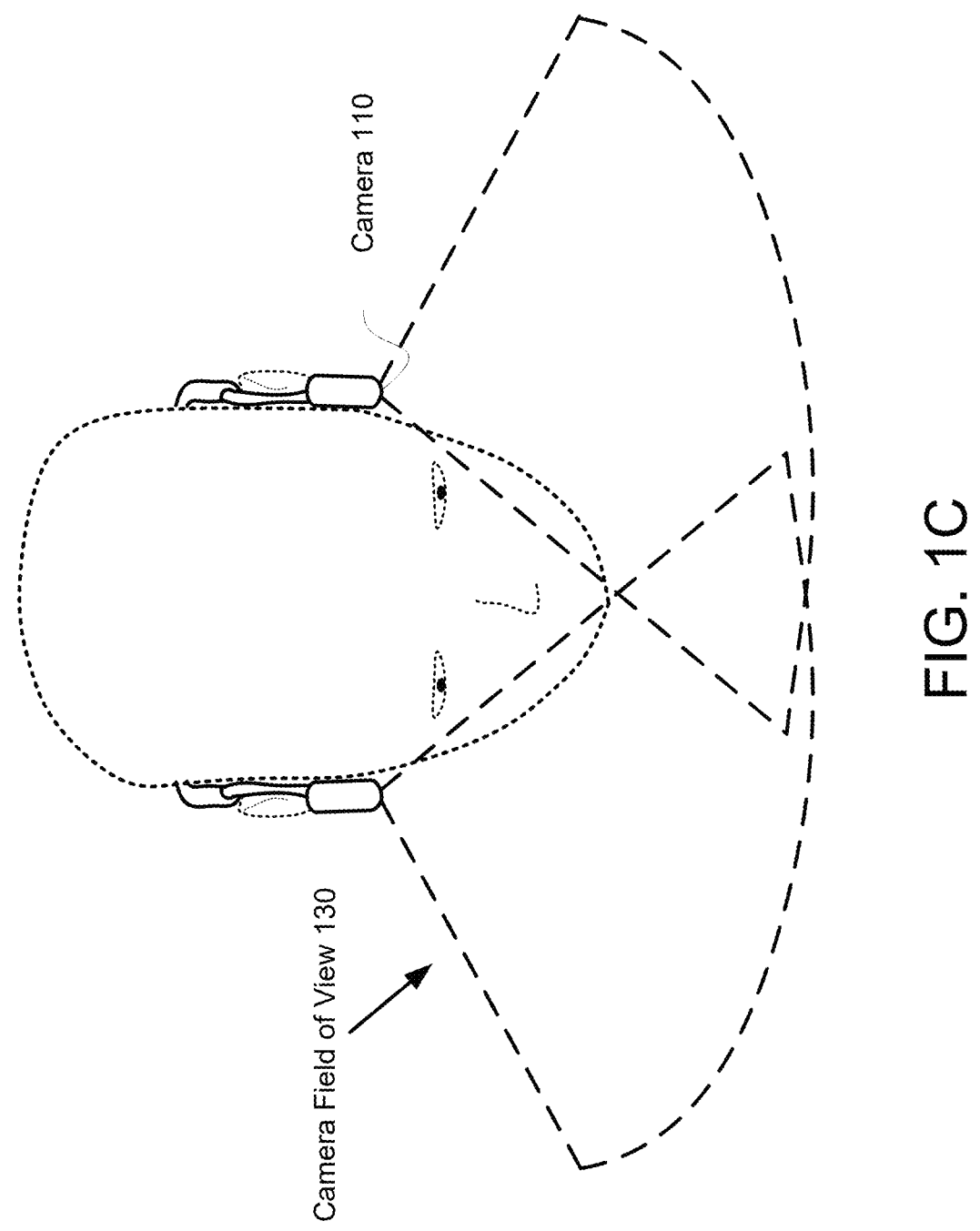

Turning to FIG. 1C, a second alternate view of display free body wearable computing device 50 in accordance with an embodiment is shown. The second alternate view of display free body wearable computing device 50 may include a top-down view of display free body wearable computing device 50 while worn by a user (drawn in short-dashed outline) and may illustrate a camera field of view established by camera 110 (drawn in long-dashed outline).

Camera 110 of integrated sensing and interaction component 100 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish a portion of camera field of view 130. Camera field of view 130 may include an angular measurement that may indicate a viewable area that may be captured by the camera.

Camera field of view 130 may be established based on the lens (e.g., a focal length of the lens) and/or the sensor (e.g., a size of the sensor) of camera 110. Each camera of the pair of cameras of camera 110 may establish a portion of camera field of view 130 that may each capture a portion of a scene at different angles and/or positions with respect to the scene by the pair of cameras.

For example, consider a scenario in which camera field of view 130 is configured by camera 110 to be 120 degrees of horizontal view. Each camera of the pair of cameras of display free body wearable computing device 50 may capture an image based on the 120 degrees of the scene present in a field of view of the user. When aggregated (e.g., used together), a field of view of the images exceed a field of field of the user. The field of view of the user may include, for example, 120 degrees of viewable area based on binocular vision (e.g., a single image perceived from a pair of images view by a pair of eyes) of the user. The pair of cameras of camera 110 may similarly capture a stereo image that may include a pair of images of the portion of the scene present in the field of view of the user at the different angles and/or positions.

The stereo image may be processed (e.g., via image stitching, aggregation, etc.) by integrated sensing and interaction component 100, data processing system 114, and/or any other entities to generate a resulting image that may include at least the portion of the scene present in the field of view of the user (e.g., a greater field of view when compared to the user's field of view based on the user's binocular vision). The resulting image may subsequently provide information (e.g., additional information that the user may not obtain based on a field of view of the user's eyes) relevant to providing computer-implemented services to the user.

Thus, as shown in FIG. 1C, camera 110 of display free body wearable computing device 50 may be adapted to capture images of at least a portion of the scene present in a user's field of view. The images may provide visual information usable to perform desired actions by display free body wearable computing device 50 for the user.

Figure 1D:
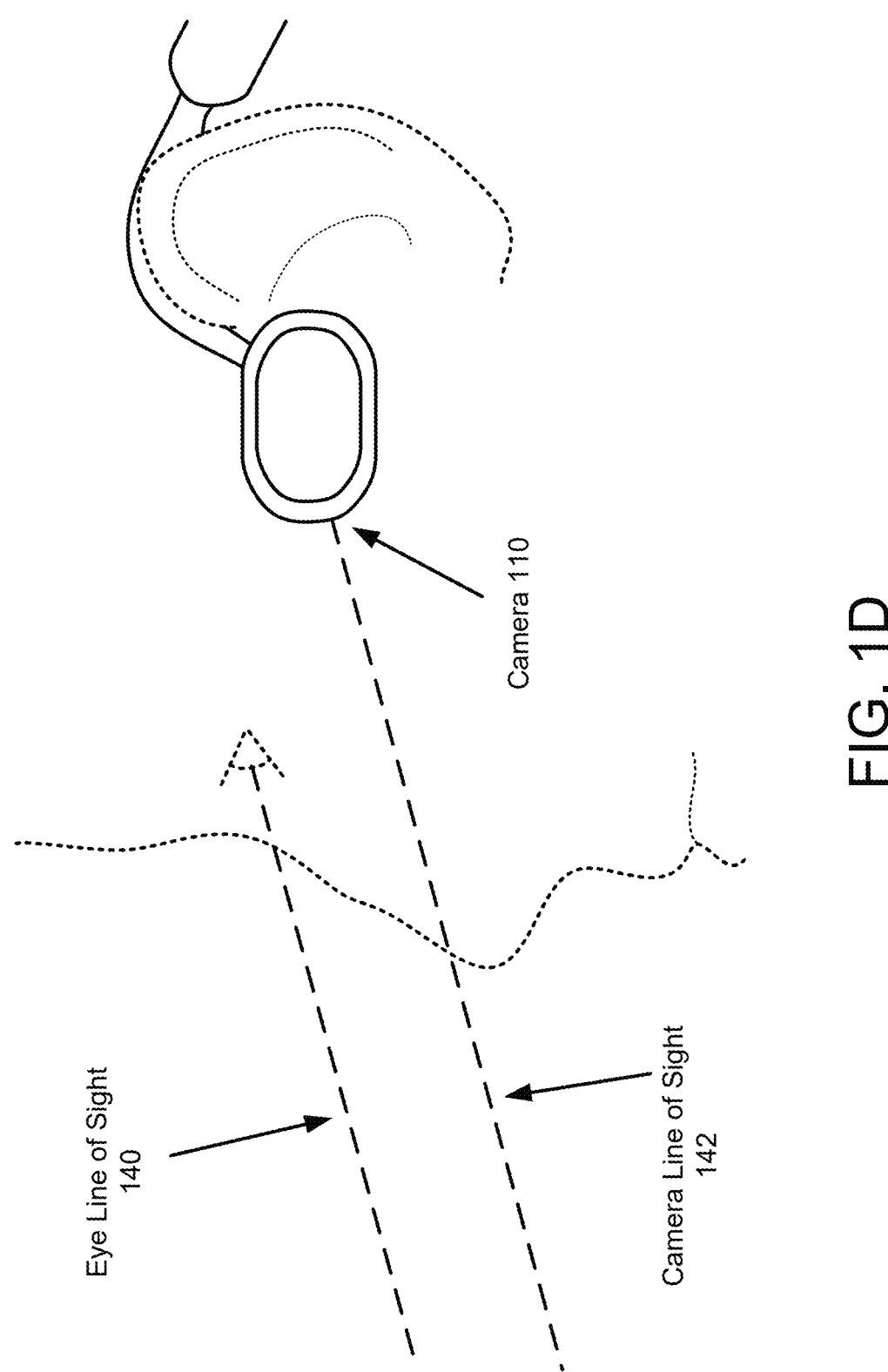

Turning to FIG. 1D, a third alternate view of display free body wearable computing device 50 in accordance with an embodiment is shown. The third alternate view of display free body wearable computing device 50 may include a side view of display free body wearable computing device 50 while worn by a user and may illustrate a camera line of sight established by camera 110.

Camera 110 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish camera line of sight 142 that may be parallel to eye line of sight 140 of the user.

Camera line of sight 142 may enable camera 110 to capture images based on a vertical field of view that may be generally aligned with a vertical field of view of the user's eyes. The vertical field of view may be established, for example, by configuring cameras 110 (e.g., in a portrait orientation) to capture a vertical field of view that may include a vertical field of view of the user's eyes. By doing so, camera 110 may capture images of arm/hand movements and/or gestures when performed by the user.

Thus, as shown in FIG. 1D, cameras of display free body wearable computing device 50 may be adapted to capture images that may enable a user to interact with display free body wearable computing device 50 based on the user's line of sight.

Figure 2:
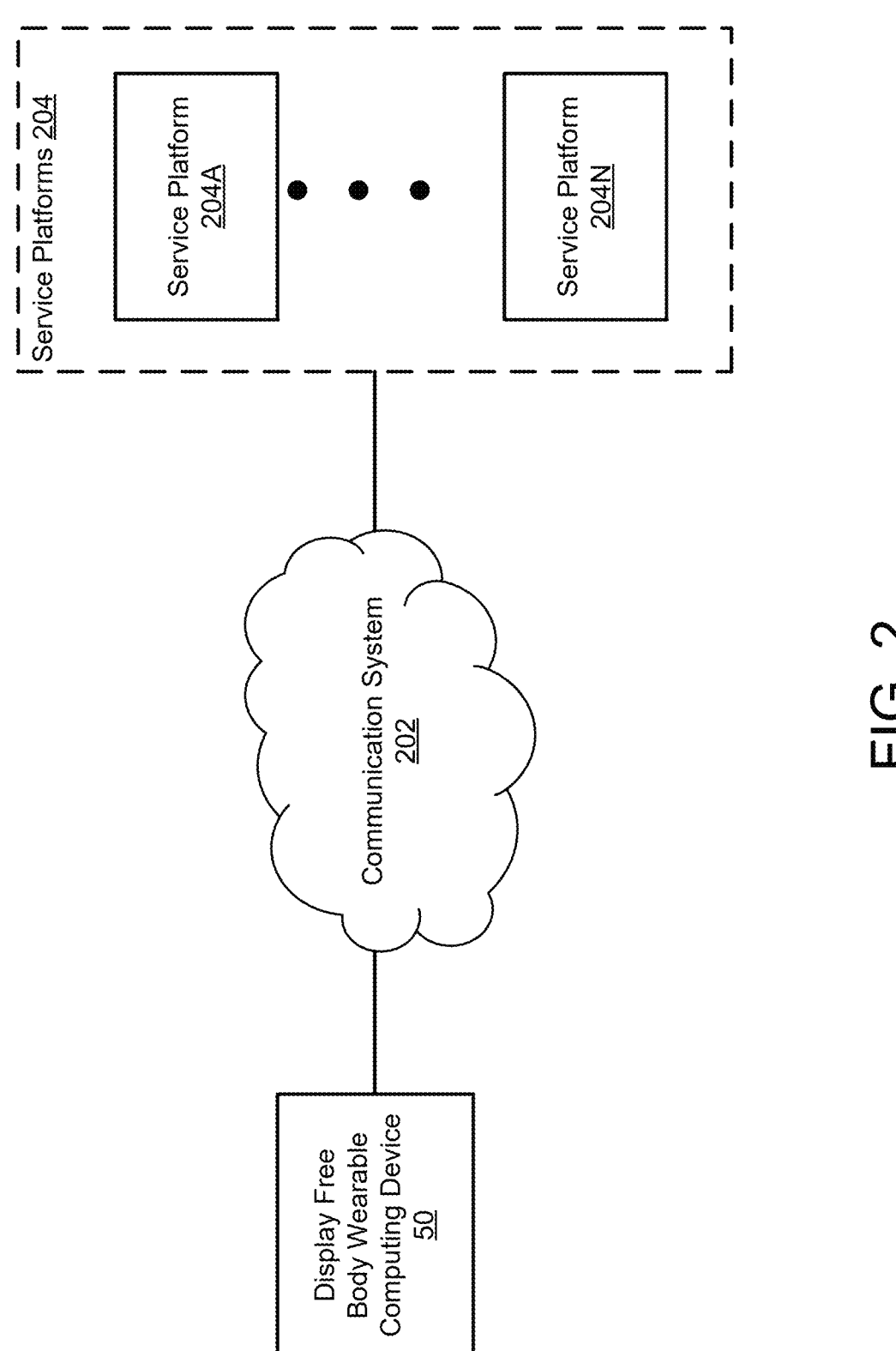
FIG. 2 shows a diagram illustrating a system in accordance with an embodiment.

Turning to FIG. 2, a block diagram in accordance with an embodiment is shown. The block diagram may illustrate a system used in providing computing-implemented services by the display free body wearable computing device.

Display free body wearable computing device 50 may, as previously discussed, provide computer-implemented services to a user. While providing the computer-implemented services, display free body wearable computing device 50 may interact with service platforms 204 to obtain information relevant to the computer-implemented services provided to the user.

Service platforms 204 may, as discussed above, provide remote computing services. Service platforms 204 may include any number and/or type of service platforms that may individually and/or cooperatively perform services requested by display free body wearable computing device 50. Service platforms 204 may include, for example, cloud services (e.g., image storage, speech-to-text, large language model, etc.), artificial intelligence platforms (e.g., generative artificial intelligence), and/or any other remote service platforms. Service platforms 204 may provide information based at least in part on input obtained from display free body wearable computing device 50.

For example, consider a scenario in which a user, while wearing display free body wearable computing device 50, may be looking at a bird perched on a tree in a forest. Display free body wearable computing device 50 may obtain a request (e.g., via a voice command captured by a microphone array of display free body wearable computing device 50, a gesture captured by cameras of from display free body wearable computing device 50, etc.) from the user indicating a desire for a picture of the bird. Display free body wearable computing device 50 may: (i) obtain data that may include an image of the scene, (ii) pre-process the data (e.g., focus the image on the bird, stitch images from a plurality of images captured by cameras of display free body wearable computing device 50, etc.) to obtain a unified image, (iii) communicate the unified image to a service platform (e.g., 204A) of service platforms 204, and/or perform any other actions. Service platform 204A may perform, for example, object recognition services, information search services, and/or any other services to capture the desired image based on the unified image provided by display free body wearable computing device 50. Service platform 204A and/or a second service platform (e.g., service platform 204B) may store the desired image in an image storage service for subsequent retrieval by a user of display free body wearable computing device 50.

Consider a second scenario in which a user of display free body wearable computing device 50 desires to generate a three-dimensional (3D) interactive model of a room that the user is present. Once a request for the 3D interactive model is identified, body wearable computing device 50 may: (i) provide instruction to the user (e.g., to move around the room), (ii) capture images using the camera at a certain frequency (e.g., while the user is moving around the room), and/or perform any other actions. Display free body wearable computing device 50 may provide the captured images along with metadata regarding each of the captured images to a second service platform (e.g., 204B) of service platforms 204. Using image data provided by display free body wearable computing device 50, service platform 204B may perform, for example, 3D rendering services, video editing services, video storage services, and/or any other services to generate the video desired by the user. Display free body wearable computing device 50 may subsequently communicate a status (e.g., completion, instructions for access, etc.) of the desired 3D interactive model to the user.

Communication system 202 may allow any of body wearable computing device 50 and service platforms 204 to communicate with one another (and/or with other devices not illustrated in FIG. 2). To provide its functionality, communication system 202 may be implemented with one or more wired and/or wireless networks. Any of these networks may be a private network (e.g., the "Network" shown in FIG. 5), a public network, a virtual network (e.g., a virtual private network), and/or may include the Internet. For example, body wearable computing device 50 may be operably connected to service platforms 204 via the Internet, a private network, etc. Body wearable computing device 50 and service platforms 204 may be adapted to perform one or more protocols for communicating via communication system 202.

Figure 3A:
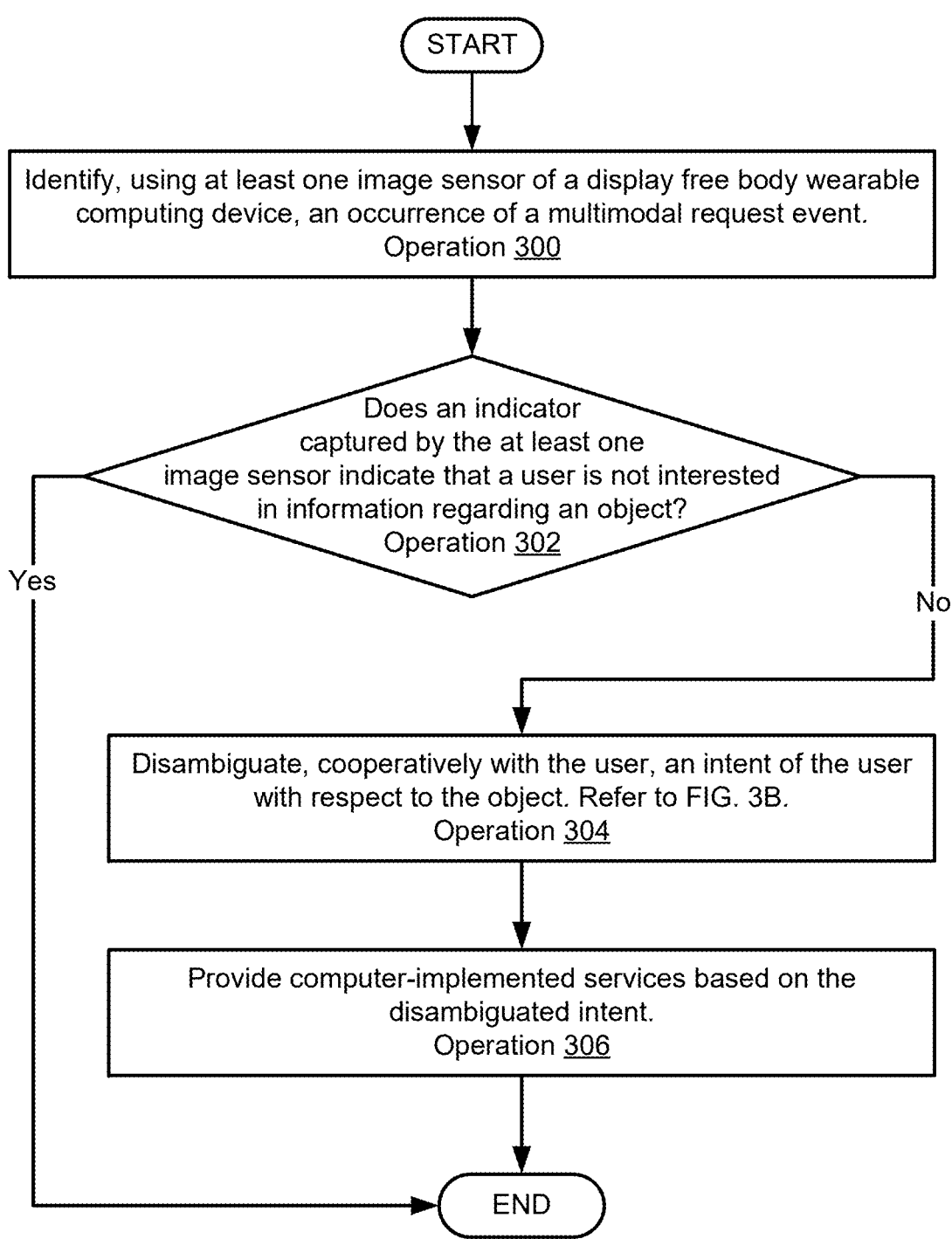
FIGS. 3A-3C show flow diagrams illustrating methods in accordance with an embodiment.
Figure 3B:
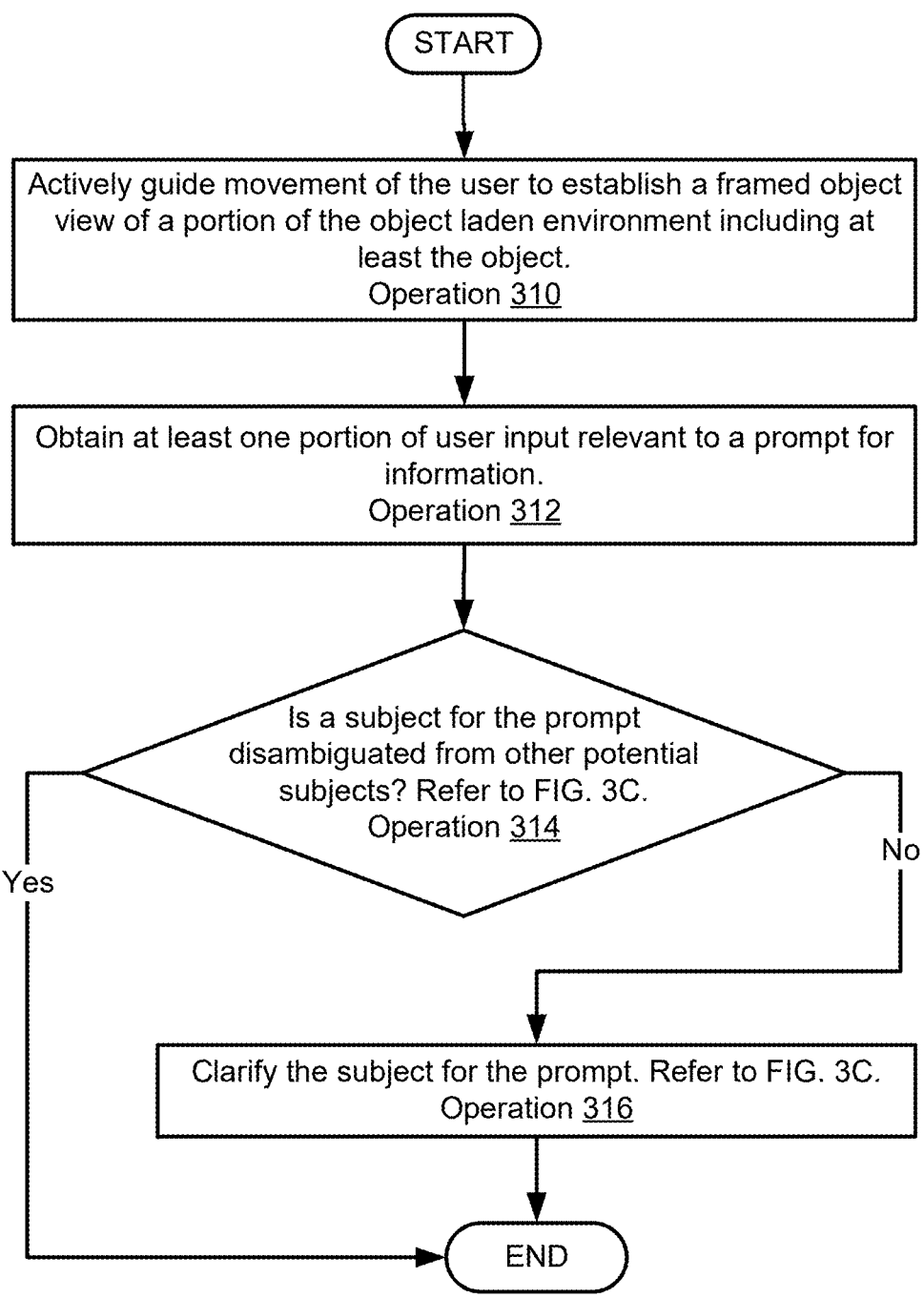
Figure 3C:
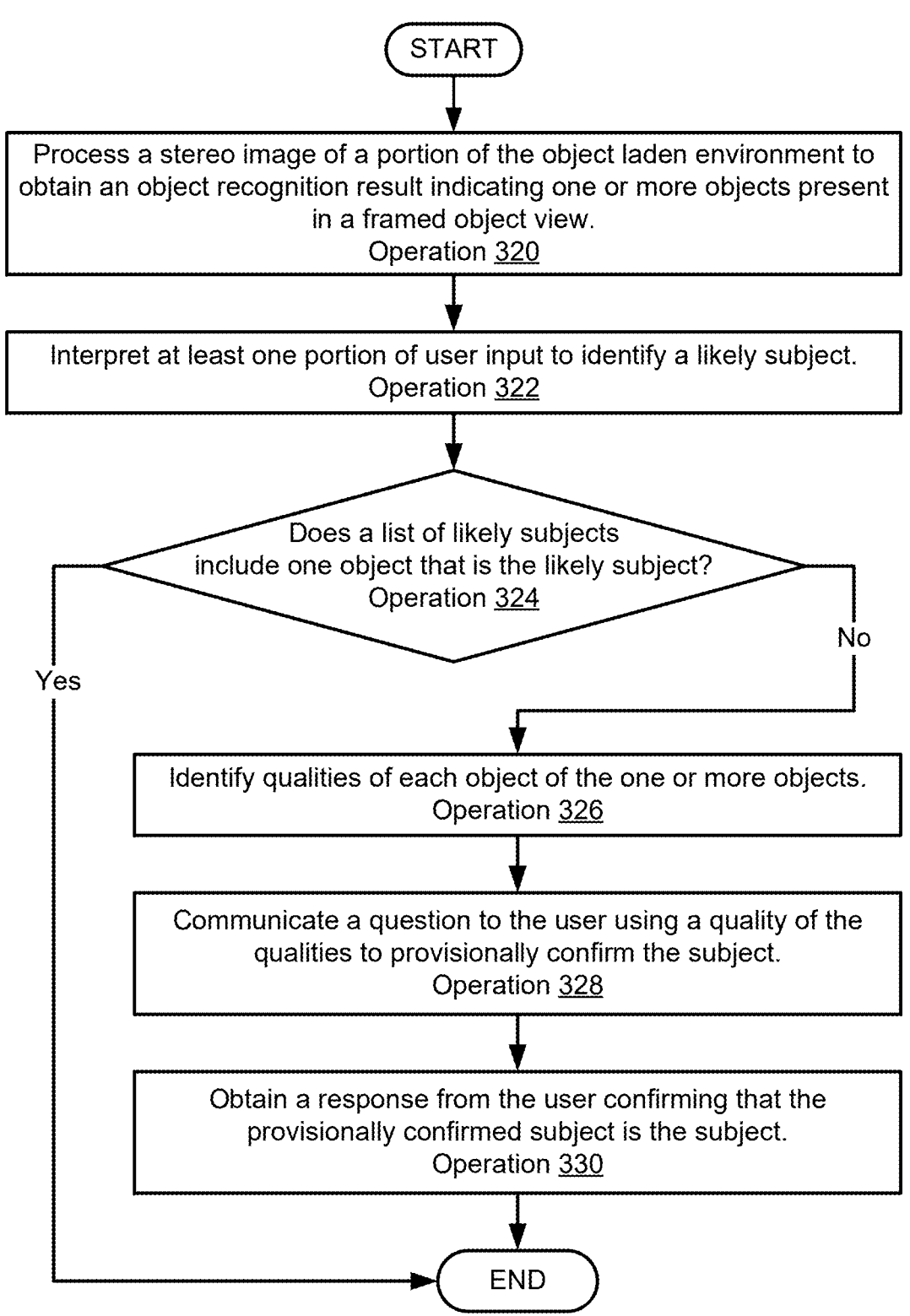

As discussed above, the components of FIGS. 1A-2 may perform various methods to facilitate use of a display free body wearable computing device in an object laden environment. FIGS. 3A-3C illustrate methods that may be performed by the components of the systems of FIG. 1A-2. In the diagrams discussed below and shown in FIGS. 3A-3C, any of the operations may be repeated, performed in different orders, and/or performed in parallel with or in a partially overlapping in time manner with other operations.

Turning to FIG. 3A, a first flow diagram illustrating a method of facilitating use of the display free body wearable computing device in accordance with an embodiment is shown. The method may be performed, for example, by any of the components of the systems of FIGS. 1A-2, and/or other components not shown therein.

At operation 300, an occurrence of a multimodal request event may be identified. The occurrence of the multimodal request event may be identified by: (i) monitoring images captured (e.g., real-time images) by camera 110 of display free body wearable computing device 50 for gestures performed by a user's hand (e.g., a pointing gesture) in camera field of view 130, (ii) receiving tactile input via touchpad 108, (iii) obtaining audio data (e.g., that may include trigger phrases) via speakers of display free body wearable computing device 50, and/or any other processes.

At operation 302, a determination may be made regarding whether at least an indicator captured by the at least one image sensor indicates that the user is not interested in information regarding an area of interest present in a field of view of the user. The area of interest may include, for example, an object and/or any other portion of the object laden environment. The determination may be made by: (i) identifying, using any number and/or type of sensors, a distance of a pointing gesture performed by the user with respect to camera 110 to compare the distance to a distance threshold (e.g., to infer that the gesture is not performed by another person), (ii) identifying that a time that the pointing gesture is maintained in field of view 130 meets criteria (e.g., at least a certain number of milliseconds to indicate intent), (iii) identifying that the user may be having a conversation (e.g., that a gesture was directed to another person during the conversation), and/or any other processes. If the indicator indicates that the user is not interested in information regarding the object (e.g., the determination is "Yes" at operation 302), the method may end following operation 302. If the indicator does not indicate that the user is not interested in information regarding the object (e.g., the determination is "No" at operation 302), the method may proceed to operation 304.

At operation 304, an intent of the user with respect to the object may be disambiguated cooperatively with the user. The intent of the user may be disambiguated by: (i) identifying that camera 110 may not have a desirable view of the object in an object laden environment, (ii) actively guiding movement of the user using sensory feedback to establish a framed object view of the portion of the object laden environment including at least the object, (iii) obtaining user input relevant to a prompt for information, (iv) clarifying a subject for the prompt if the subject for the prompt is not disambiguated, and/or performing any other actions. Refer to FIG. 3B for additional details regarding disambiguating an intent of the user.

At operation 306, computer-implemented services may be provided based on the disambiguated intent. The computer-implemented services may be provided by: (i) prompting a large language model using the prompt to obtain desired information regarding the object, (ii) capturing any number of additional images of the subject based on the prompt, (iii) sequentially re-prompting, by the user, display free body wearable computing device 50 for sequentially refined information regarding the subject, (iv) communicating the desired information, via speakers of display free body wearable computing device 50, to the user, and/or performing any other actions.

The method may end following operation 306.

Using the method shown in FIG. 3A, information relevant to an object in an object laden environment may be obtained by a display free body wearable computing device based on a multimodal request event from a user of the display free body wearable computing device. By doing so, a quality of computer-implemented services provided by the display free body wearable computing device to the user based on the information may be improved.

Turning to FIG. 3B, a second flow diagram illustrating a method of disambiguating an intent of a user of a display free body wearable computing device with respect to an object from other objects in an object laden environment is accordance with an embodiment is shown. The method may be performed, for example, by any of the components of the systems of FIGS. 1A-2, and/or other components not shown therein.

At operation 310, movement of the user may be actively guided to establish a framed object view of a portion of the object laden environment including at least the object. The movement of the user may actively be guided by: (i) providing audio cues (e.g., sounds, beeps, etc.) adapted to direct the user to reposition the user's head and/or hand with respect to the object, (ii) modifying a quality of the audio cues (e.g., tone, volume, etc.) based on the movement of the user with respect to the object, (iii) identifying that a desired portion (e.g., a percentage) of the object is in a field of view of camera 110, (iv) providing a confirmation audio cue (e.g., a second sound) to the user when the framed object view is established by camera 110, and/or performing any other actions.

At operation 312, at least one portion of user input relevant to a prompt for information regarding the object may be obtained. The at least one portion of user input may be obtained by: (i) recording, using at least one audio sensor of display free body wearable computing device 50, audio data of speaking by the user, (ii) processing the audio data to obtain a transcription, (iii) identifying, using camera 110, a second gesture (e.g., a hand gesture corresponding to a functionality of display free body wearable computing device 50 to identify an object in a scene), and/or any other processes.

At operation 314, an identification may be made regarding whether a subject for the prompt is disambiguated from other potential subjects for the prompt. The identification may be made by: (i) capturing a stereo image using a pair of cameras of camera 110 and the framed object view, (ii) processing the stereo image to obtain an object recognition result (e.g., a list of recognizable objects in the stereo image), (iii) matching the object recognition result to a likely subject for the prompt based on the user input to obtain a list of likely subjects, (iv) determining that the list of likely subjects includes one object that is the likely subject, and/or any other processes. If the subject for the prompt is disambiguated from other potential subjects for the prompt (e.g., the identification is "Yes" at operation 314), the method may end following operation 314. If the subject for the prompt is not disambiguated (e.g., the identification is "No" at operation 314), the method may proceed to operation 316. Refer to FIG. 3C for additional details regarding identifying whether the subject for the prompt is disambiguated.

At operation 316, the subject for the prompt may be clarified. The subject for the prompt may be clarified by: (i) identifying qualities (e.g., type, color, relative location, size, etc.) for each object of the one or more objects present in the framed object view, (ii) communicating, using a speaker of display free body wearable computing device 50, a question to the user using a quality of an object to provisionally confirm the subject, (iii) obtaining, using an audio sensor of display free body wearable computing device 50, a response from the user confirming that the provisionally confirmed subject is the subject for the prompt, and/or performing any other actions. Refer to FIG. 3C for additional details regarding clarifying the subject for the prompt.

The method may end following operation 316.

Using the method shown in FIG. 3B, an intent of a user may be disambiguated with respect to an object from other objects by capturing a desired image of the object and interpreting a subject for a prompt from user input. By doing so, desired information may be provided to the user of the display free body wearable computing device.

Turning to FIG. 3C, a third flow diagram illustrating a method of clarifying a subject for one or more objects in a portion of an object laden environment based on user input in accordance with an embodiment is shown. The method may be performed, for example, by any of the components of the systems of FIGS. 1A-2, and/or other components not shown therein.

At operation 320, a stereo image of a portion of the object laden image may be processed to obtain an object recognition result. The stereo image may be processed by: (i) providing the stereo image as an input to a trained inference model (e.g., a convolution neural network), (ii) prompting a generative model using the stereo image to identify objects in the stereo image, (iii) obtaining data (e.g., identity, confidence level, attributes, etc.) regarding objects in the stereo image using from any number and/or types of object recognition services, and/or any other processes.

At operation 322, at least one portion of user input may be interpreted to identify a likely subject. The at least one portion of user input may be interpreted by: (i) obtaining (e.g., using speech-to-text services, speech recognition applications, etc.) a transcription of a prompt spoken by the user, (ii) extracting the likely subject based on a prompt template (e.g., "What is this object?") recognizable to display free body wearable computing device 50, (iii) prompting a large language model (e.g., a generative model) to identify a likely subject for the prompt based on the transcription (e.g., of an identity of the object, characteristics of the object, etc.), (iv) generating a projection extending from an index finger of the user's hand while performing a pointing gesture to the likely subject, and/or any other processes.

At operation 324, a determination may be made regarding whether a list of likely subjects includes one object that is the likely subject. The determination may be made by: (i) matching the object recognition result (e.g., obtained at operation 320) to the likely subject (e.g., obtained at operation 322) to obtain a list of likely subject, (ii) analyzing the list of likely subjects (e.g., based on confidence levels, thresholds, etc.), (iii) identifying a presence of the likely subject in the list of likely subjects and/or a quantity of likely subjects, (iv) arranging the list of objects based on a relative distance (e.g., foreground, background, etc.), and/or performing any other actions. If the list of likely subjects includes one object that is the likely subject (e.g., the determination is "Yes" at operation 324), the method may end following operation 324. If the list of likely subjects does not include one object that is the likely subject (e.g., the determination is "No" at operation 324), the method may proceed to operation 326.

At operation 326, qualities of each object of the one or more objects present in the framed object view may be identified. The qualities may be identified by: (i) performing feature extraction on the objects to identify a set of qualities, (ii) prompting an inference model using a stereo image of the objects to obtain information regarding each of the objects, and/or performing any other actions.

At operation 328, a question may be communicated to the user using a quality of the qualities to provisionally confirm the subject. The question may be communicated by: (i) inferring a subject that is more likely than other potential subjects (e.g., based on a confidence level, order of a list of likely subjects, etc.), (ii) identifying a distinctive quality (e.g., via feature analysis) of the qualities of the subject, (iii) providing at least the distinctive quality and/or an identity of the subject to a clarifying question template, (iv) converting a text of the clarifying question to a speech format, (v) transmitting the clarifying question, via speakers of display free body wearable computing device 50, to the user, and/or performing any other actions.

At operation 330, a response may be obtained from the user confirming that the provisionally confirmed subject is the subject. The response may be obtained by: (i) obtaining audio input (e.g., a verbal confirmation), via an audio sensor of display free body wearable computing device 50, spoken by the user, (ii) identifying, via camera 110, a recognizable confirmation gesture (e.g., a thumbs up) performed by the user confirming the provisionally confirmed subject, (iii) obtaining tactile feedback (e.g., a double tap), via touchpad 108, from the user, (iv) processing an audio response from the user to refine the subject and/or the prompt, and/or any other processes.

The method may end following operation 330.

Using the method shown in FIG. 3C, a subject for a prompt regarding an object may be disambiguated when more than one objects that may be subjects for the prompt are present in the framed object view of an object laden environment. By doing so, relevant information may be obtained by the display free body wearable computing device regarding the subject that the user wishes to obtain information.

Thus, using the method illustrated in FIGS. 3A-3C, a data processing system in accordance with an embodiment may be more likely to be able to obtain more relevant information to provide computer implemented services.

To further clarify details of the disclosed embodiments, FIGS. 4A-4F show example figures depicting activity that may occur while the methods shown in FIGS. 3A-3C are performed.

Figures 4A, 4B:
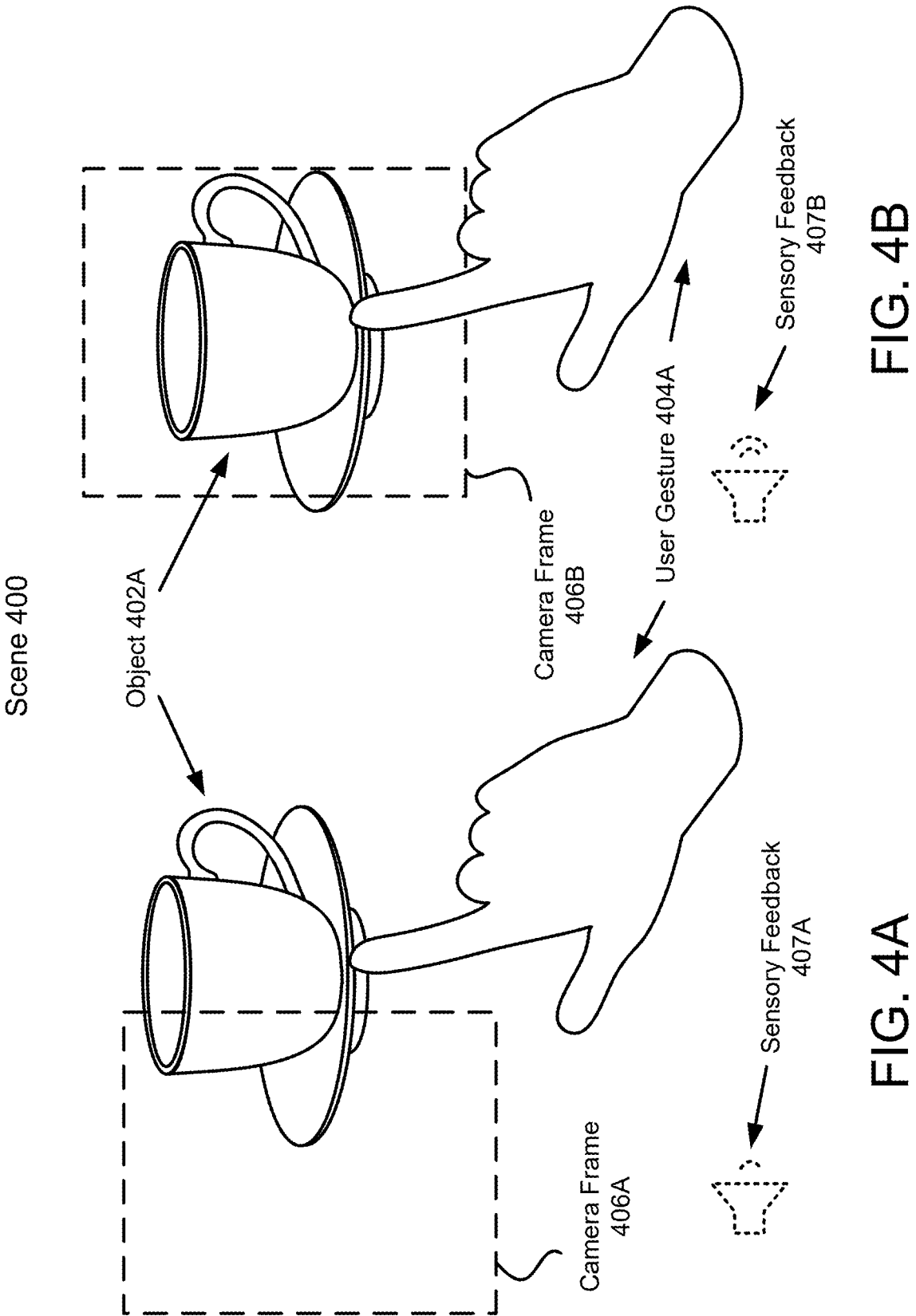
FIGS. 4A-4F show example diagrams illustrating activity that may occur during performance of methods in accordance with an embodiment.

Turning to FIGS. 4A-4B, a first and second example diagram showing activity that may occur while guiding movement of a user of display free body wearable computing device 50 to establish a framed object view in accordance with an embodiment is shown. FIGS. 4A-4B may be shown, for example, from a perspective of camera 110 of display free body wearable computing device 50.

In FIG. 4A, the user of display free body wearable computing device 50 may be present in scene 400. Scene 400 may include object 402A (e.g., a cup and saucer, as shown in FIG. 4A) in addition to any number of other objects (not shown). The user may convey interest in object 402A by performing user gesture 404A (e.g., a pointing gesture). When user gesture 404A is performed by the user, camera 110 may capture an indicator (e.g., the pointing gesture) and a multimodal request event may be identified by display free body wearable computing device 50.

When identified, display free body wearable computing device 50 may screen the indicator for conditions that indicate that the user is not interested in information regarding object 402A. For example, indicators (e.g., hand gestures) may be filtered that may have been performed by a person other than the user, be in part of a transient movement of the user, and/or exhibit any other conditions that do not indicate an intent to convey interest in obtaining information from display free body wearable computing device 50 regarding an object. The conditions may include, for example, (i) a distance of the pointing gesture with respect to the at least one image sensor exceeding a distance threshold; (ii) a time that the pointing gesture is maintained in a field of view of the at least one image sensor meeting criteria; and (iii) an identification that the user is having a conversation.

In an instance where the indicator does not exhibit any of the conditions, display free body wearable computing device 50 may cooperatively, with the user, disambiguate intent of the user with respect to object 402A from the other objects (not shown). For example, in FIG. 4A, a field of view of camera 110 may include camera frame 406A (shown in long-dashed lines) based on a position and/or angle of the user's head while viewing scene 400, and/or a position of the user's hand while performing user gesture 404A. Because camera frame 406A may not capture a desired portion of object 402A and/or the position of the user's hand may be misaligned with the field of view of camera 110 with respect to object 402A, display free body wearable computing device may actively guide movement of the user (e.g., readjustment of the user's hand and/or head with respect to object 402A) to establish a framed object view of a portion of scene 400 that may include the desired portion of object 402A.

To do so, display free body wearable computing device 50 may provide, using at least speakers of integrated sensing and interaction component 100, sensory feedback (e.g., audio cues) to direct the user to reposition at least the user's head with respect to object 402A. For example, sensory feedback 407A (shown in short-dashed lines) may be transmitted to the user while camera frame 406A is established. Sensory feedback 407A may include, for example, a sound with a first set of qualities (e.g., a lower volume, a first tone, etc.) that may provide information usable to initiate adjustment by the user. When the user repositions the user's head and/or the user's hand while performing user gesture 404A to establish a more desirable camera frame than camera frame 406A, a quality of sensory feedback 407A may be modified (e.g., volume may be increased) and transmitted to the user to inform the user that the repositioning of the user's head may have improved the camera frame and/or may have established the framed object view (e.g., camera frame 406B shown in FIG. 4B).

In FIG. 4B, the framed object view may have been established based on camera frame 406B (shown in long-dashed lines) while the user performs user gesture 404A and the repositioning of the user's head while being actively guided by display free body wearable computing device 50. For example, when established, sensory feedback 407B (shown in short-dashed lines) may be provided to the user. Sensory feedback 407B may include, for example, a confirmation audio cue (e.g., a chime) with a second set of qualities (e.g., a higher volume compared to sensory feedback 407A, a second tone, etc.).

Camera frame 406B may include a portion of the scene that includes the desired portion of object 402A usable by display free body wearable computing device 50, for example, to identify a quality of object 402A, to establish interest in object 402A based at least on user gesture 404A, and/or provide any other information.

Furthermore, the user may convey interest in capturing a stereo image of the portion of scene 400A while camera frame 406B is established by camera 110 by performing a second gesture. Refer for FIGS. 4C-4E for additional details regarding the second gesture performed by the user using camera frame 406B.

The user may subsequently provide user input relevant to a prompt for information regarding object 402A. The user input may include, for example, a verbal question (e.g., "What is this?", "What color is this?", "Where can I buy this cup?", etc.) relevant to object 402A.

Display free body wearable computing device 50 may interpret the user input to identify object 402A as the subject for the prompt. In an instance where the subject for the prompt is not disambiguated from other potential subjects of the prompt, display free body wearable computing device 50 may disambiguate object 402A as the subject by clarifying the subject with the user. Refer to FIG. 4F for additional details regarding clarifying the subject for the prompt.

Based on the user input and an image of object 402A captured while camera frame 406B is established, display free body wearable computing device 50 may provide computer-implemented services by communicating information relevant to the prompt. For example, display free body wearable computing device 50 may prompt a large language model using a transcription of a question spoken by the user and the image of object 402A to obtain desired information. Display free body wearable computing device 50 communicate the desired information to the user, for example, by transmitting the desired information via speakers of integrated sensing and interaction component 100.

Figures 4C, 4D, 4E:
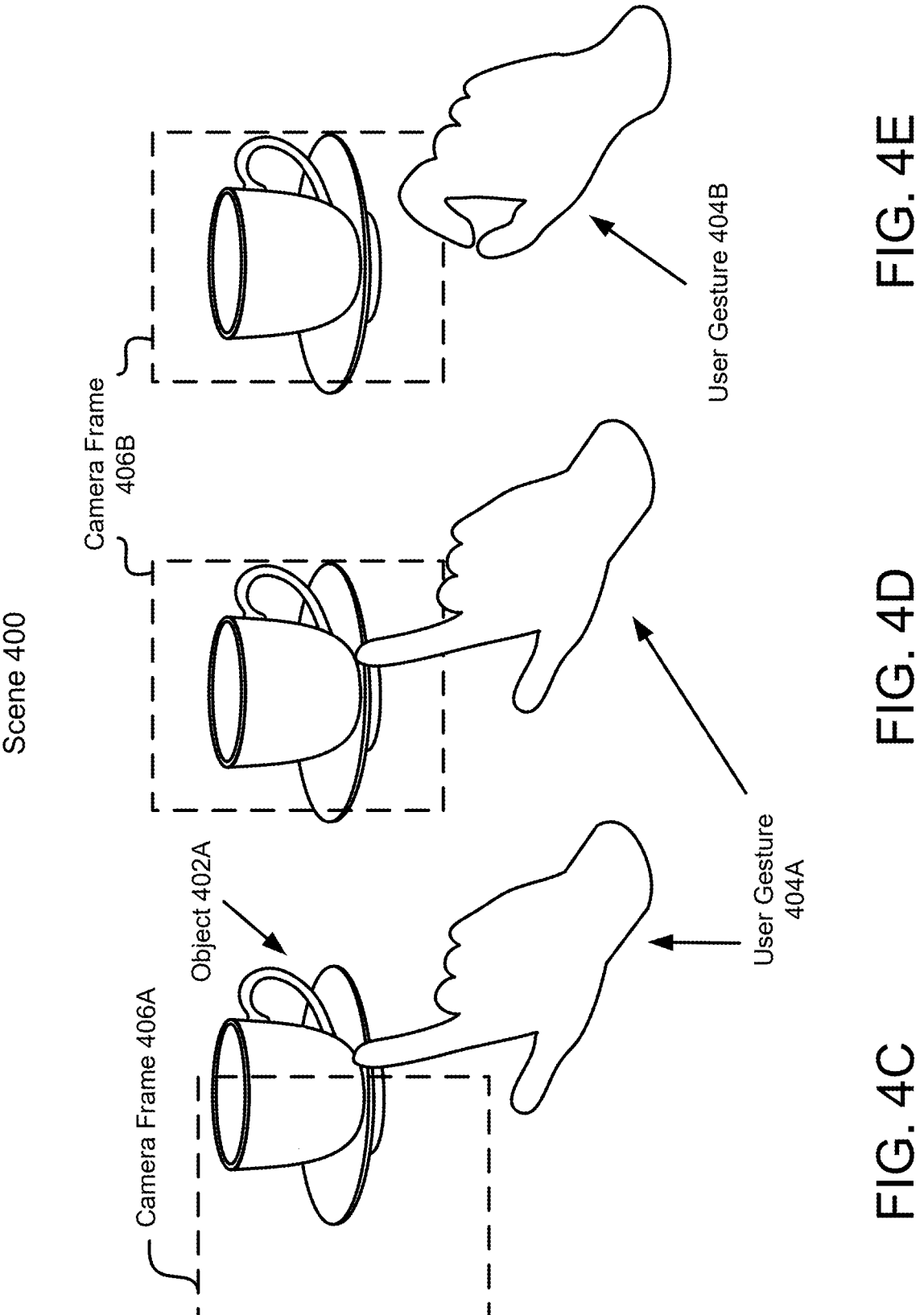
Figure 4F:
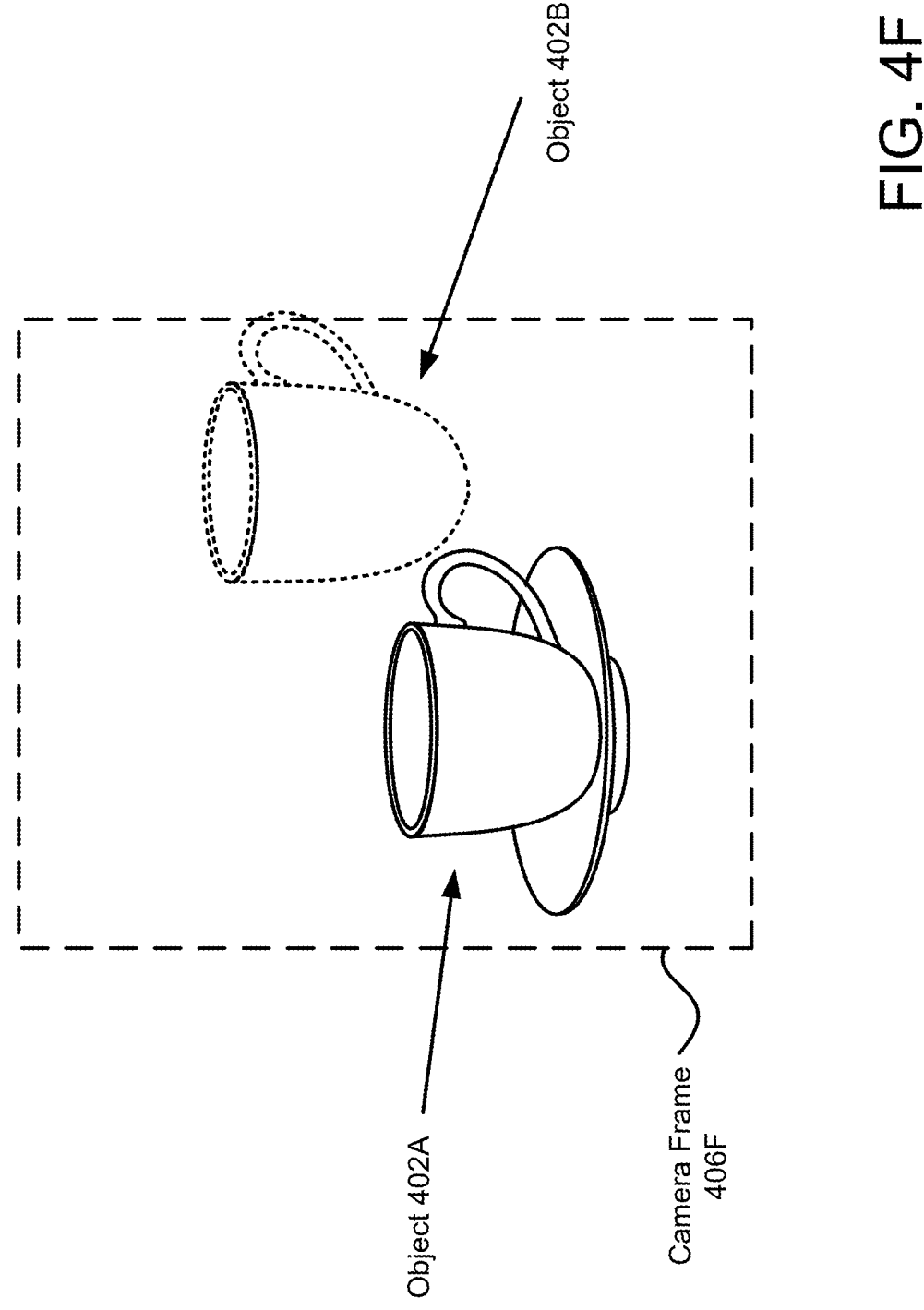

Turning to FIGS. 4C-4E, a second, third, and fourth example diagram showing activity that may occur while a snapshot image of an object is captured based on a user gesture performed by a user of display free body wearable computing device 50 in accordance with an embodiment is shown.

As previously discussed (e.g., in FIGS. 4A-4B) and as shown in FIGS. 4C-4D, camera frame 406B may be established by actively guiding movement of the user upon identification of an occurrence of a multimodal request event (e.g., user gesture 404A).

In FIG. 4E, prior to obtaining user input relevant for information regarding object 402A, camera 110 may obtain an image depicting a second gesture (e.g., user gesture 404B) performed by the user. User gesture 404B may include, for example, a snapshot gesture used by the user to convey interest in capturing a snapshot image of at least object 402A using camera frame 406B. The snapshot image may be used to enable sequential re-prompting for sequentially refined information regarding a subject and/or to be stored for subsequent retrieval by the user.

For example, the user may wish to: ask a plurality of questions regarding the subject in camera frame 406B, use the image of object 402A as a reference for comparison with a second image (e.g., taken following the first image of object 402A captured in FIG. 4E) of second object in a second portion of the object laden environment, and/or any other purposes.

Thus, using at least the image captured using camera frame 406B, display free body wearable computing device 50 may provide relevant computer-implemented services by providing desired information regarding object 402A to the user.

Turning to FIG. 4F, a sixth example diagram showing activity that may occur while clarifying a subject for a prompt provided by a user of display free body wearable computing device 50 in accordance with an embodiment is shown.

Prior to FIG. 4F, display free body wearable computing device 50 may have established camera frame 406F based on indicators (e.g., user gestures) and guiding of movement of the user (e.g., similar to actions discussed in FIGS. 4A-4E).

Camera frame 406F may include a portion of an object laden environment that may include at least object 402A (e.g., the cup and saucer) and object 402B (e.g., a second cup shown in short-dashed lines). The user may subsequently provide user input relevant to a prompt for information regarding object 402A (e.g., "What color is this cup?"). However, because at least two cups (e.g., object 402A and object 402B) are present in camera frame 406F, object 402A may not be disambiguated as a subject for the prompt from other potential subjects for the prompt.

To identify that object 402A is disambiguated, display free body wearable computing device 50 may process (e.g., via object segmentation, object recognition, and/or any other services provided by data processing system 114 and/or remote entities) a stereo image captured using camera frame 406F to obtain an object recognition result. The object recognition result may include, for example, a list of the two cups in camera frame 406F. When identified that the two cups may each be potential subjects for the prompt, display free body wearable computing device 50 may attempt to clarify the subject with respect to object 402A or object 402B.

To do so, display free body wearable computing device 50 may identify qualities of each of the potential subjects. For example, using at least the stereo image, display free body wearable computing device 50 may obtain a result that indicates a set of qualities of object 402A (e.g., a relative location, size, attribute, etc.) and a second set of qualities of object 402B. Display free body wearable computing device 50 may communicate, using at least a speaker, a question to the using a quality of the set of qualities to provisionally confirm the subject. For example, display free body wearable computing device may clarify whether the user intended to obtain information regarding the cup on the left, the shorter cup, the cup with a saucer, and/or any other provisionally confirming questions using a quality of an object.

The user may provide a response (e.g., a verbal confirmation, a thumbs up gesture, tactile input via touchpad 108, etc.) that confirms the provisionally confirmed subject as object 402A. Once confirmed as the subject, display free body wearable computing device 50 may provide computer-implemented services by providing the desired information regarding object 402A to the user.

Thus, using the method shown in FIGS. 4A-4F, display free body wearable computing device 50 may disambiguate an intent of a user of display free body wearable computing device 50 with respect to an object in an object laden environment. By doing so, display free body wearable computing device 50 may provide information that may be of higher relevance to the user.

Figure 5:
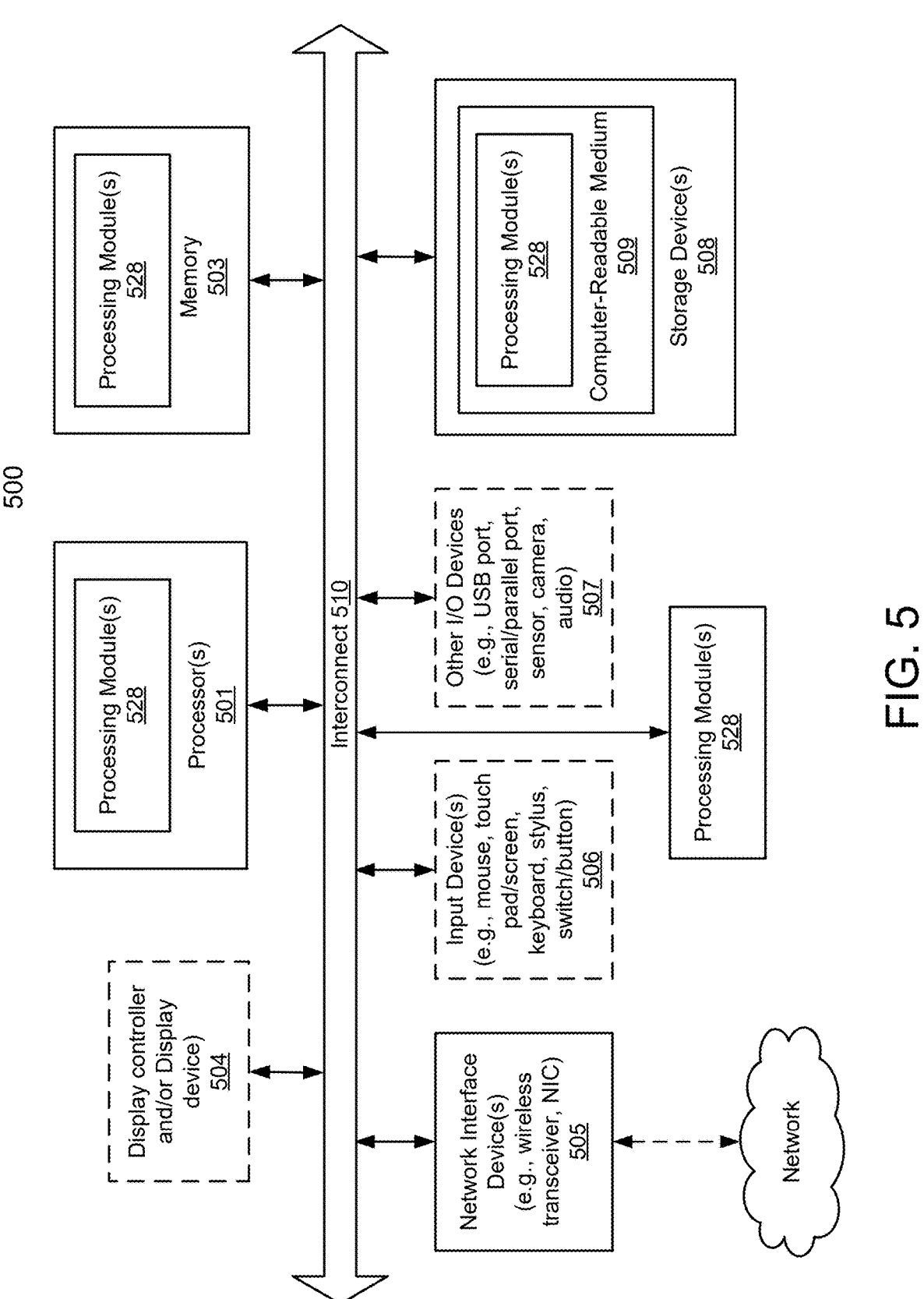
FIG. 5 shows a block diagram illustrating a data processing system in accordance with an embodiment.

Any of the components illustrated in FIGS. 1A-2 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone array to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for facilitating use of a display free body wearable computing device in an object laden environment, the display free body wearable computing device comprises image sensors and the method comprising:

identifying, using at least one image sensor of the image sensors of the display free body wearable computing device, an occurrence of a multimodal request event:

from a user of the display free body wearable computing device, and for information regarding an object of objects present in the object laden environment;

based on the occurrence:

screening at least an indicator captured by the at least one image sensor of the image sensors for conditions that indicate that the user is not interested in the information regarding the object;

in an instance of the screening where the indicator does not exhibit any of the conditions:

cooperatively, with the user, disambiguating an intent of the user with respect to the object from other objects of the objects by at least:

actively guiding movement of the user using sensory feedback to establish, using at least two of the image sensors of the display free body wearable computing device, a framed object view of a portion of the object laden environment comprising at least the object; and based on the disambiguated intent, providing computer implemented services.

2. The method of claim 1, wherein the indicator comprises a pointing gesture depicted in an image captured by the at least one image sensor, and the pointing gesture is used by the user to convey interest in the object.

3. The method of claim 2, wherein cooperatively disambiguating the intent of the user further comprises:

obtaining, using the at least one image sensor of the display free body wearable computing device, at least one portion of user input relevant to a prompt for the information;

identifying, based on the at least one portion of user input, whether a subject for the prompt is disambiguated from other potential subjects for the prompt; and in an instance of the identifying where the subject for the prompt is not disambiguated: clarifying the subject for the prompt.

4. The method of claim 3, wherein the conditions comprise at least one selected from a group consisting of:

a distance of the pointing gesture with respect to the at least one image sensor exceeding a distance threshold;

a time that the pointing gesture is maintained in a field of view of the at least one image sensor of the image sensors meeting criteria; and an identification that the user is having a conversation.

5. The method of claim 3, wherein actively guiding the movement of the user using the sensory feedback comprises:

providing at least audio cues adapted to direct the user to reposition a user's head with respect to the object while the user is wearing the display free body wearable computing device; and providing a confirmation audio cue to the user when the framed object view of the object is established through the repositioning of the user's head.

6. The method of claim 3, wherein the at least one portion of user input comprises:

a voice input describing an identity of the subject;

a voice input describing a characteristic of the subject; and a pointing gesture directed towards the subject.

7. The method of claim 3, wherein identifying whether the subject for the prompt is disambiguated comprises:

processing a stereo image obtained by the at least two of the image sensors and using the framed object view to obtain an object recognition result, the object recognition result indicating one or more objects present in the framed object view;

interpreting the at least one portion of user input to identify a likely subject;

matching the object recognition result to the likely subject to obtain a list of likely subjects; and in a first instance of the matching where the list of likely subjects comprises one object that is the likely subject:

concluding that the subject for the prompt is disambiguated; and in a second instance of the matching where the list of likely subjects does not comprise the one object that is the likely subject:

concluding that the subject for the prompt is not disambiguated.

8. The method of claim 7, wherein clarifying the subject for the prompt comprises:

identifying qualities of each object of the one or more objects present in the framed object view;

communicating, using at least a speaker of the display free body wearable computing device, a question to the user using a quality of the qualities of an object of the one or more objects to provisionally confirm the subject; and obtaining, using an audio sensor of the display free body wearable computing device, a response from the user confirming that the provisionally confirmed subject is the subject.

9. The method of claim 3, further comprising, prior to obtaining the at least one portion of the user input relevant to the prompt:

obtaining, using the at least one image sensor, an image depicting a second gesture performed by the user to convey interest in capturing a snapshot stereo image of the framed object view.

10. The method of claim 9, wherein the snapshot stereo image enables, during the computer implemented services, sequential re-prompting for sequentially refined information regarding the subject.

11. The method of claim 1, wherein the display free body wearable computing device comprises:

an integrated sensing and interaction component adapted to:

be positioned symmetrically on two portions of a user's head, be positioned between ears and eyes of the user, and capture a stereo image of at least a portion of a scene present in a field of view of the user;

an integrated computing, powering, and securing portion; and an adjustment member adapted to position the integrated sensing and interaction component with respect to the integrated computing, powering, and securing portion.

12. The method of claim 11, wherein the integrated sensing and interaction component comprises:

a pair of cameras;

speakers;

a microphone; and a touch pad.

13. The method of claim 12, wherein the integrated sensing and interaction component is adapted to:

obtain the stereo image from the pair of cameras;

at least partially process the stereo image to obtain an image processing result;

identify an action to be performed based, at least in part, on the image processing result and a derived result from a remote entity, the derived result being based, at least in part, on the stereo image and/or the image processing result; and use at least the speakers to perform the action.

14. The method of claim 11, wherein the integrated computing, powering, and securing portion is adapted to:

obtain an audio input from the integrated sensing and interaction component;

perform a speech recognition action set, based on the audio input, to obtain a speech recognition result;

obtain a portion of data from a remote entity, the data being based at least in part on the speech recognition result; and use the portion of the data to assist in an interaction that the user is involved in.

15. A non-transitory machine-readable medium having instructions stored therein, which when executed by a processor, cause the processor to perform operations for facilitating use of a display free body wearable computing device in an object laden environment, the display free body wearable computing device comprises image sensors and the operations comprising:

identifying, using at least one image sensor of the image sensors of the display free body wearable computing device, an occurrence of a multimodal request event:

from a user of the display free body wearable computing device, and for information regarding an object of objects present in the object laden environment;

based on the occurrence:

screening at least an indicator captured by the at least one image sensor of the image sensors for conditions that indicate that the user is not interested in the information regarding the object;

in an instance of the screening where the indicator does not exhibit any of the conditions:

cooperatively, with the user, disambiguating an intent of the user with respect to the object from other objects of the objects by at least:

actively guiding movement of the user using sensory feedback to establish, using at least two of the image sensors of the display free body wearable computing device, a framed object view of a portion of the object laden environment comprising at least the object; and based on the disambiguated intent, providing computer implemented services.

16. The non-transitory machine-readable medium of claim 15, wherein the indicator comprises a pointing gesture depicted in an image captured by the at least one image sensor, and the pointing gesture is used by the user to convey interest in the object.

17. The non-transitory machine-readable medium of claim 16, cooperatively disambiguating the intent of the user further comprises:

obtaining, using the at least one image sensor of the display free body wearable computing device, at least one portion of user input relevant to a prompt for the information;

identifying, based on the at least one portion of user input, whether a subject for the prompt is disambiguated from other potential subjects for the prompt; and in an instance of the identifying where the subject for the prompt is not disambiguated: clarifying the subject for the prompt.

18. A data processing system, comprising:

a processor;

and a memory coupled to the processor to store instructions, which when executed by the processor, cause the processor to perform operations for facilitating use of a display free body wearable computing device in an object laden environment, the display free body wearable computing device comprises image sensors and the operations comprising:

identifying, using at least one image sensor of the image sensors of the display free body wearable computing device, an occurrence of a multimodal request event:

from a user of the display free body wearable computing device, and for information regarding an object of objects present in the object laden environment;

based on the occurrence:

screening at least an indicator captured by the at least one image sensor of the image sensors for conditions that indicate that the user is not interested in the information regarding the object;

in an instance of the screening where the indicator does not exhibit any of the conditions:

cooperatively, with the user, disambiguating an intent of the user with respect to the object from other objects of the objects by at least:

actively guiding movement of the user using sensory feedback to establish, using at least two of the image sensors of the display free body wearable computing device, a framed object view of a portion of the object laden environment comprising at least the object; and based on the disambiguated intent, providing computer implemented service.

19. The data processing system of claim 18, wherein the indicator comprises a pointing gesture depicted in an image captured by the at least one image sensor, and the pointing gesture is used by the user to convey interest in the object.

20. The data processing system of claim 19, wherein cooperatively disambiguating the intent of the user further comprises:

obtaining, using at least one sensor of the display free body wearable computing device, at least one portion of user input relevant to a prompt for the information;

identifying, based on the at least one portion of user input, whether a subject for the prompt is disambiguated from other potential subjects for the prompt; and in an instance of the identifying where the subject for the prompt is not disambiguated: clarifying the subject for the prompt.

* * * * *